(12) United States Patent
Choi et al.

(10) Patent No.: US 12,498,545 B2
(45) Date of Patent: Dec. 16, 2025

(54) SMALL LENS SYSTEM

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seong Jun Bae, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 631 days.

(21) Appl. No.: 17/813,265

(22) Filed: Jul. 18, 2022

(65) Prior Publication Data

US 2023/0048740 A1 Feb. 16, 2023

(30) Foreign Application Priority Data

Jul. 28, 2021 (KR) .................. 10-2021-0098990

(51) Int. Cl.
*G02B 13/00* (2006.01)
*G02B 3/04* (2006.01)
*G02B 9/62* (2006.01)
*G02B 13/18* (2006.01)

(52) U.S. Cl.
CPC .......... *G02B 13/0045* (2013.01); *G02B 3/04* (2013.01); *G02B 9/62* (2013.01); *G02B 13/18* (2013.01)

(58) Field of Classification Search
CPC ......... G02B 13/0045; G02B 9/62; G02B 9/64
See application file for complete search history.

(56) References Cited

U.S. PATENT DOCUMENTS

| | | | | |
|---|---|---|---|---|
| 2016/0161716 A1* | 6/2016 | Chae | ................. | G02B 13/0045 359/713 |
| 2017/0123186 A1* | 5/2017 | Shin | ..................... | G02B 5/208 |
| 2018/0356614 A1* | 12/2018 | Hsueh | ................. | G02B 13/001 |

* cited by examiner

*Primary Examiner* — Alexander P Gross
(74) *Attorney, Agent, or Firm* — Mendelsohn Dunleavy, P.C.

(57) ABSTRACT

Disclosed is a small lens system including a first lens, a second lens, a third lens, a fourth lens, a fifth lens, and a sixth lens sequentially arranged from an object, wherein the first lens has a refractive power (P1) satisfying −0.01<P1<0.01, the second lens has a refractive power (P2) satisfying 0.4<P2, the third lens has a negative refractive power, the third lens having a curvature (C6) of an image-side surface satisfying −0.01<C6<0.01, the fourth lens has a refractive power (P4) satisfying −0.1<P4<0.1, the fifth lens has a refractive power (P5) satisfying 0.7<P5, the sixth lens has a refractive power (P6) satisfying P6<−0.7, and the total optical path length (TOPL) of the lens system and an image height (Himg) satisfy TOPL/Himg <1.8.

7 Claims, 12 Drawing Sheets

SMALL LENS SYSTEM

CROSS REFERENCE TO RELATED APPLICATION

The present application claims priority to Korean Patent Application No. 10-2021-0098990, filed Jul. 28, 2021 the entire contents of which is incorporated herein for all purposes by this reference.

BACKGROUND OF THE INVENTION

Field of the Invention

The present invention relates to a small lens system including a total of six lenses, and more particularly to a small lens system configured such that the refractive power of each lens is set in order to alleviate sensitivity of the small lens system.

Description of the Related Art

Recent mobile terminals are equipped with a camera, with which it is possible to perform video communication and to take photographs. In addition, as the number of functions of the camera in the mobile terminal gradually increases, demand for high resolution and wide angle of a camera for mobile terminals has gradually increased, and there is a trend toward miniaturization of the camera such that the mobile terminal can be easily and conveniently carried.

In recent years, a lens of the camera has been made of a plastic material, which is lighter than glass, in order to realize high quality, high performance, and miniaturization of the camera, and the number of lenses is universally increased in order to realize high resolution.

For recent smartphones, it is advantageous to miniaturize a camera by reducing the size of a camera opening due to expansion of a display. To this end, it is important to reduce an effective diameter of a first lens.

Particular, for a small lens mounted in a smartphone, it is advantageous to reduce the length of the lens system (total track length) as much as possible due to limitation in the thickness of the smartphone.

In addition, with increasing resolution of a sensor, a high-resolution lens is required. However, sensitivity of a conventional lens system is very high, whereby performance yield thereof is reduced.

A lens system disclosed in each of U.S. Pat. No. 8,379,323 B2 and U.S. Pat. No. 8,830,595 B2 shown in FIGS. 1 and 2 includes a total of six lenses sequentially arranged from an object, wherein TTL (the distance from a front surface (an object-side surface) of each lens to an image surface (an image sensor), which is related to the length of each lens, is long, and a stop is located at a first lens, whereby the refractive power of the first lens is high, and therefore sensitivity of the lens system is high.

In addition, a second lens is formed so as to be adjacent to the first lens while having a negative refractive power, whereby the lens system has a high-sensitivity structure.

Also, in the conventional lens system, most power is concentrated on the first lens and the second lens, whereby dependence on the power of the first lens and the second lens is high. As a result, sensitivity of the lens system is high, and therefore there is a shortcoming in that the lens system is sensitive to tolerance.

Particularly, if a miniature lens system is sensitive to tolerance, products may have different performances. Therefore, there is a need for research to alleviate sensitivity of the lens system to tolerance, thereby relatively easily improving performance reproducibility of a product.

SUMMARY OF THE INVENTION

The present invention has been made in view of the above problems, and it is an object of the present invention to provide a small lens system including a total of six lenses and configured such that the refractive power and shape of each lens are set in order to alleviate sensitivity of the small lens system.

In accordance with an aspect of the present invention, the above and other objects can be accomplished by the provision of a small lens system including a first lens, a second lens, a third lens, a fourth lens, a fifth lens, and a sixth lens sequentially arranged from an object, wherein the first lens has a refractive power (P1) satisfying $-0.01 < P1 < 0.01$, the second lens has a convex object-side surface and a convex image-side surface, the second lens having a refractive power (P2) satisfying $0.4 < P2$, the third lens has a negative refractive power, the third lens having a curvature (C6) of an image-side surface satisfying $-0.01 < C6 < 0.01$, the fourth lens has a refractive power (P4) satisfying $-0.1 < P4 < 0.1$, the fifth lens has a refractive power (P5) satisfying $0.7 < P5$, the sixth lens has a refractive power (P6) satisfying $P6 < -0.7$, and the total optical path length (TOPL) of the lens system, which is the sum $$\left( TOPL = \sum_{n=1}^{16}(CTn \times Ndn) \right)$$

of values obtained by multiplying the distance from an object-side surface of the first lens to an image sensor by the refractive powers of the respective lenses, and an image height (Himg) satisfy $TOPL/Himg < 1.8$.

In addition, the value of Sag (SAG42) of an outermost side of an effective diameter of an image-side surface of the fourth lens and the value of Sag (SAG51) of an outermost side of an effective diameter of an object-side surface of the fifth lens may satisfy $0.1 < |SAG42| + |SAG51| < 0.5$.

In addition, the lens thickness (et1) at the height of an effective diameter of an image-side surface of the first lens and the central thickness (ct1) of the first lens may satisfy $|et1 - ct1| < 0.07$ mm.

In addition, the lens thickness (et4) at the height of an effective diameter of an image-side surface of the fourth lens and the central thickness (ct4) of the fourth lens may satisfy $|et4 - ct4| < 0.05$ mm.

In addition, the lens thickness (et5) at the height of an effective diameter of an image-side surface of the fifth lens and the central thickness (ct5) of the fifth lens may satisfy $|et5 - ct5| > 0.14$ mm.

In addition, all surfaces of the first lens to the sixth lens may be formed as aspherical surfaces, and each of the lenses may be made of plastic.

In addition, the Abbe number (V1) of the first lens, the Abbe number (V2) of the second lens, the Abbe number (V3) of the third lens, the Abbe number (V4) of the fourth lens, the Abbe number (V5) of the fifth lens, and the Abbe number (V6) of the sixth lens may respectively satisfy $50 < V1 < 60$, $50 < V2 < 60$, $15 < V3 < 30$, $15 < V4 < 30$, $50 < V5 < 60$, and $50 < V6 < 60$.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a lens system including a total of six lenses, and more particularly to a lens system configured such that a first lens, a second lens, a third lens, a fourth lens, a fifth lens, and a sixth lens are sequentially arranged from an object along an optical axis.

In addition, the lens system is configured such that chromatic aberration of the lens system is corrected while the lens system is small and lightweight by appropriately designing the refractive power, shape, etc. of each lens and such that TTL is short even though the six lenses are used, whereby the lens system is easily applicable to a thin or small camera module, particularly a smartphone.

In particular, the refractive power of each lens is set such that the first lens has a very low refractive power and the second lens has a high positive refractive power while having opposite convex surfaces, whereby sensitivity of the lens system to tolerance is alleviated.

In addition, the fifth lens has a high positive refractive power, and the sixth lens has a high negative refractive power, whereby the length of the lenses is reduced, and the total optical path length (TOPL) of the lens system and an image height (Himg) satisfy TOPL/Himg <1.8, whereby TTL of the lens system is reduced, and therefore a small-thickness, high-performance lens system is provided.

Figure 1:
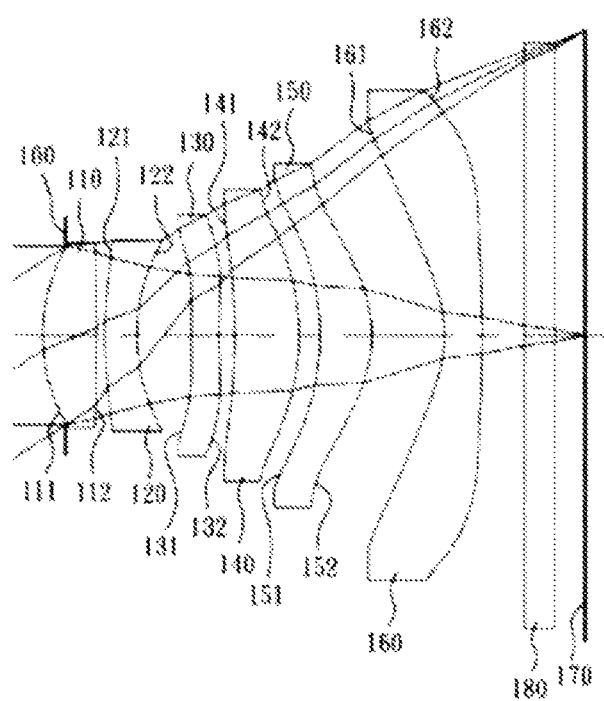
FIGS. 1 and 2 are views showing conventional small lens systems.
Figure 2:
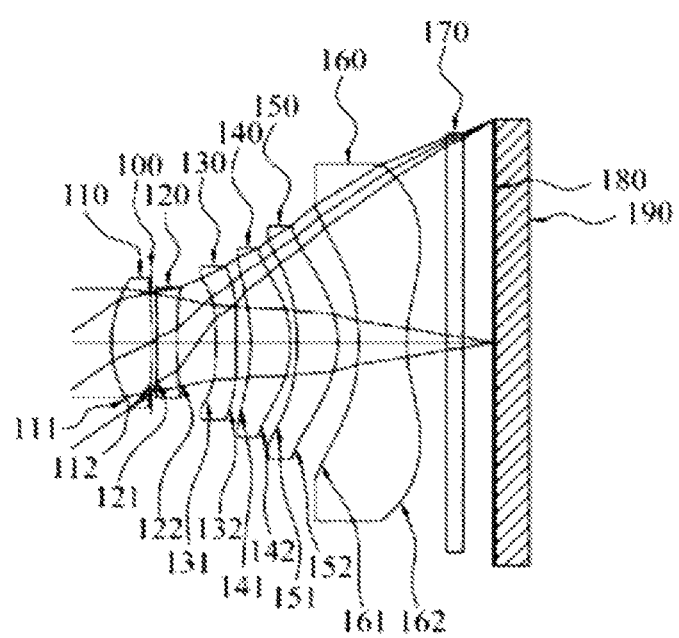
Figure 3:
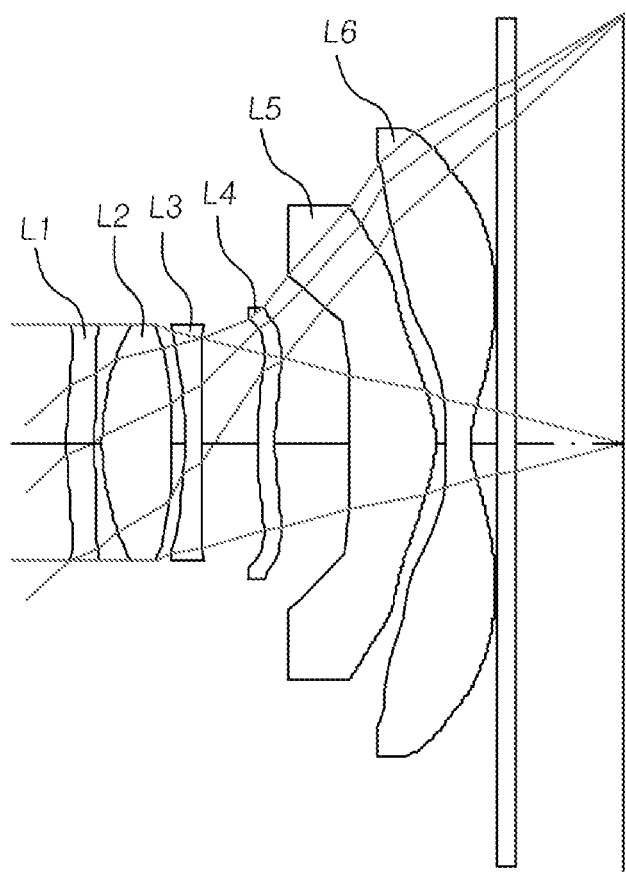
FIG. 3 is a view showing a first embodiment of a small lens system with alleviated sensitivity according to the present invention.
Figure 4:
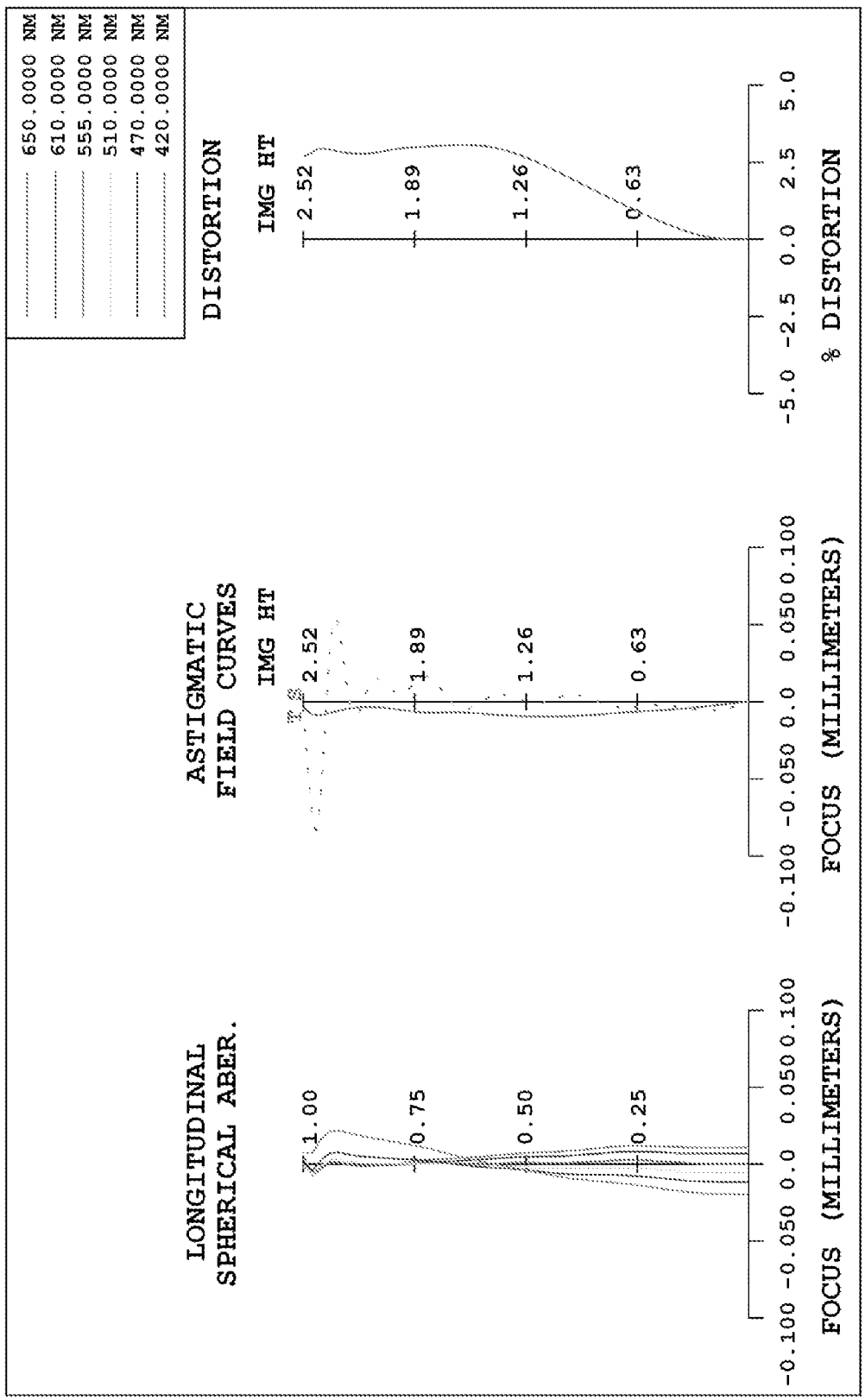
FIG. 4 is a view showing aberration according to a first embodiment of the present invention.
Figure 5:
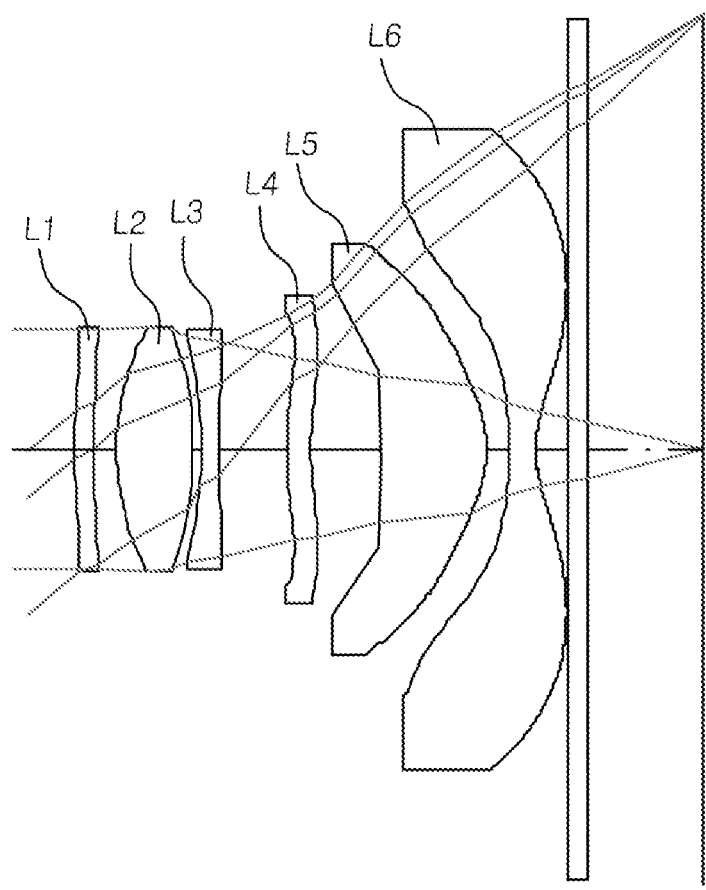
FIG. 5 is a view showing a second embodiment of the small lens system with alleviated sensitivity according to the present invention.
Figure 6:
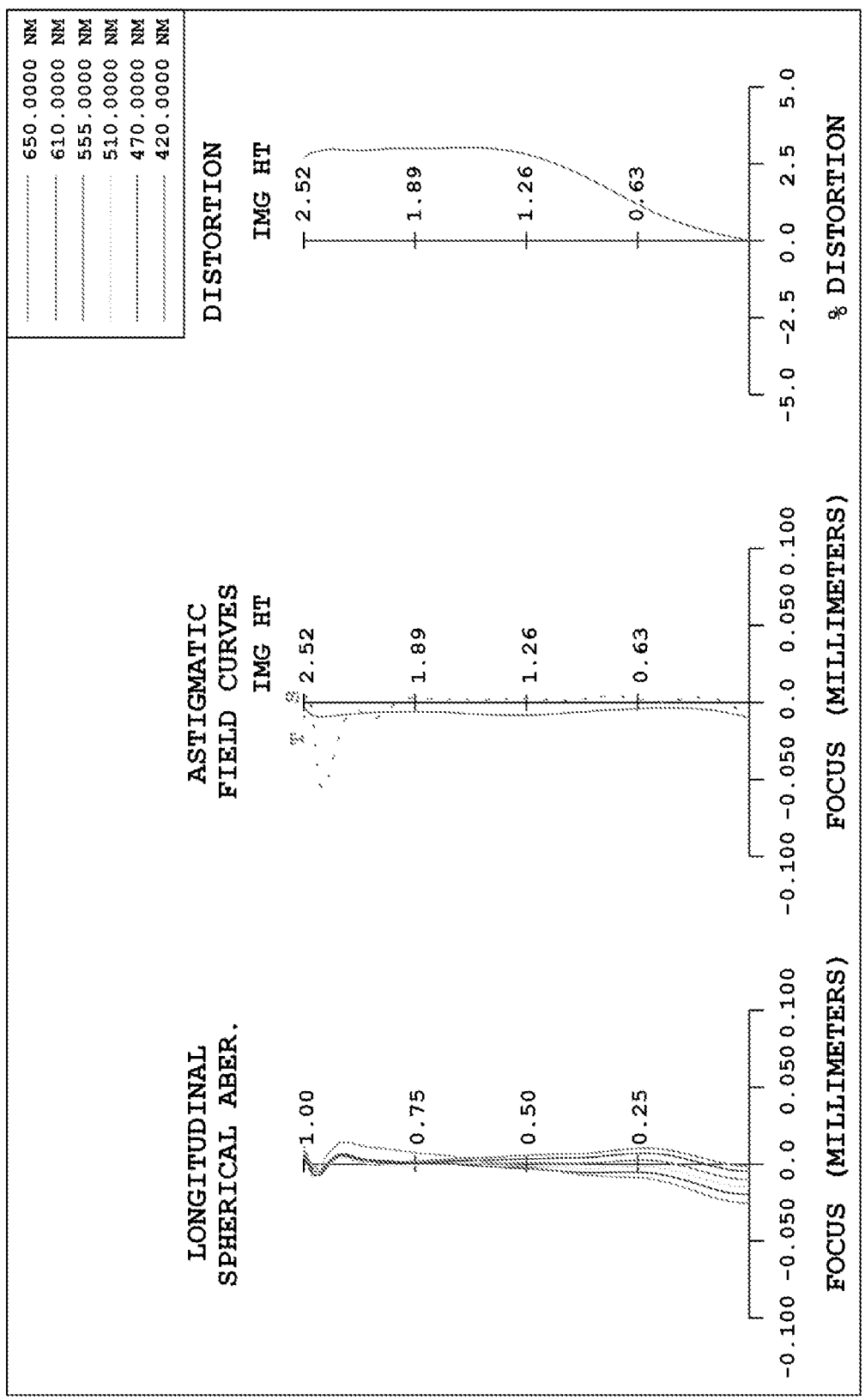
FIG. 6 is a view showing aberration according to a second embodiment of the present invention.
Figure 7:
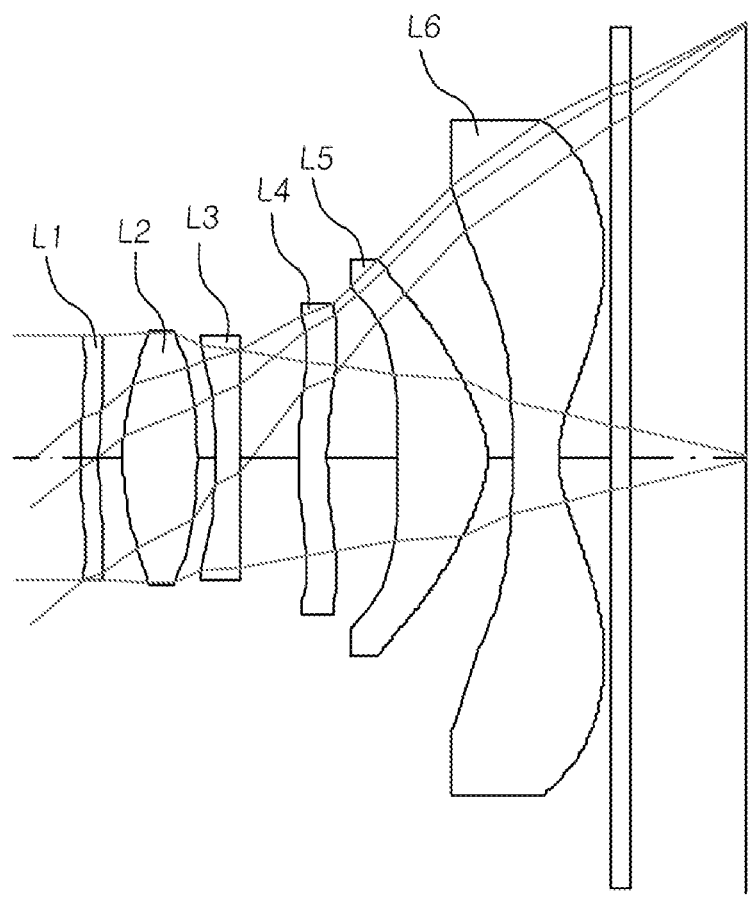
FIG. 7 is a view showing a third embodiment of the small lens system with alleviated sensitivity according to the present invention.
Figure 8:
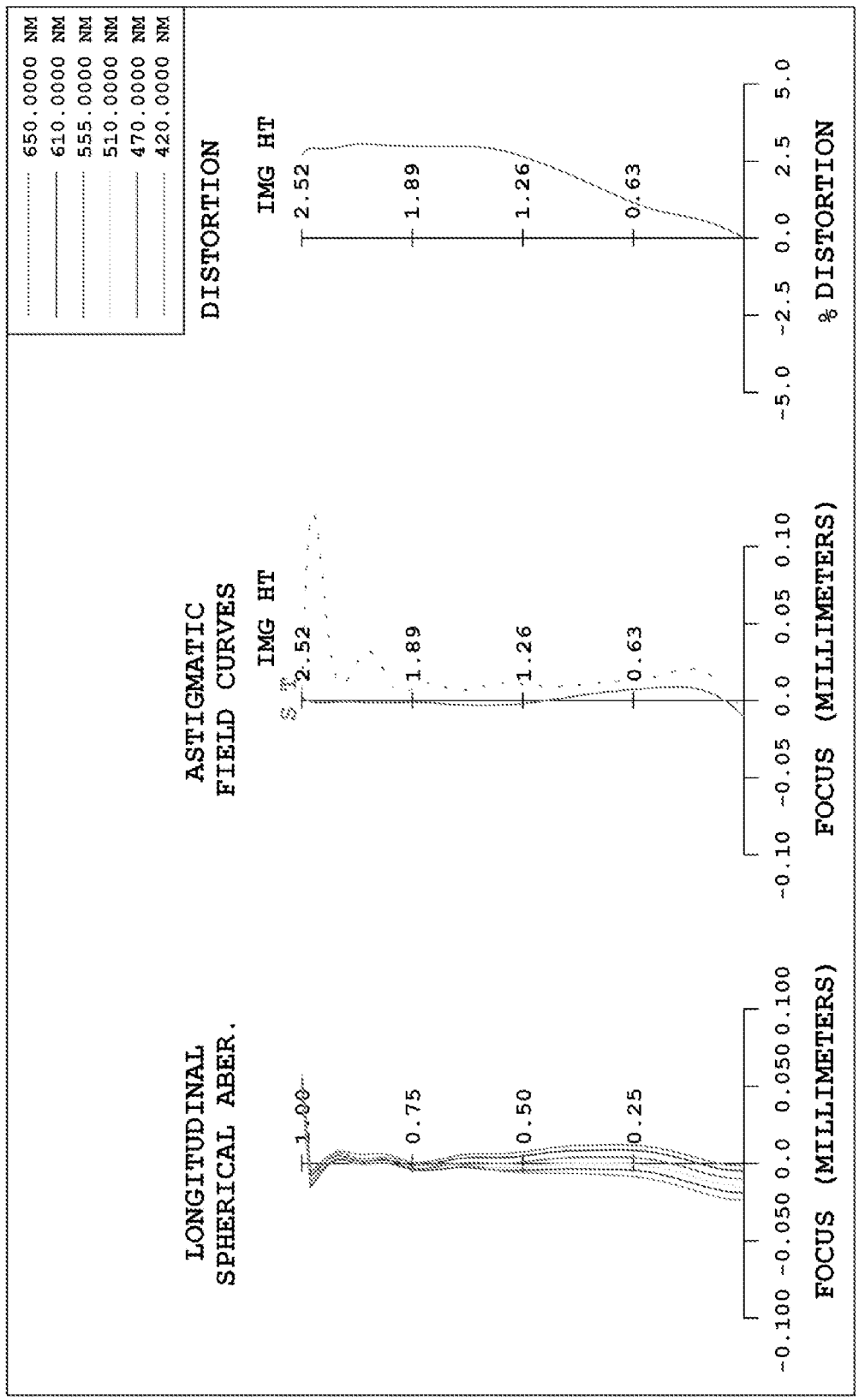
FIG. 8 is a view showing aberration according to a third embodiment of the present invention.
Figure 9:
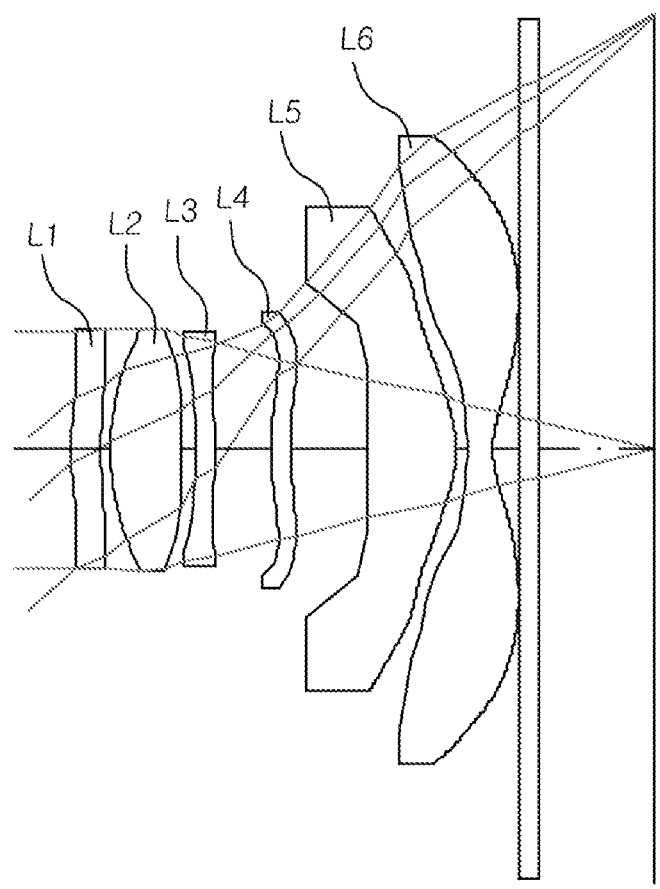
FIG. 9 is a view showing a fourth embodiment of the small lens system with alleviated sensitivity according to the present invention.
Figure 10:
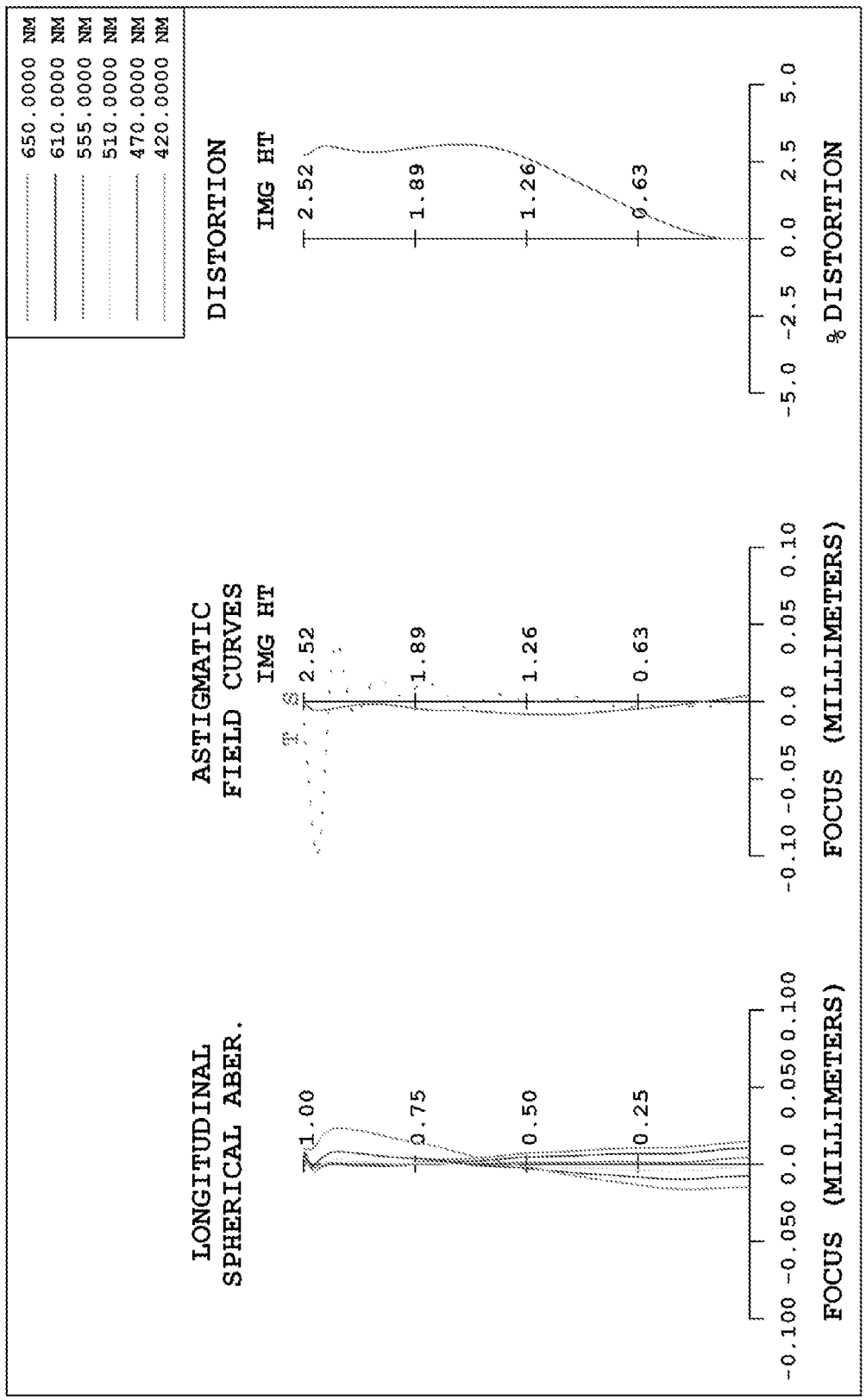
FIG. 10 is a view showing aberration according to a fourth embodiment of the present invention.
Figure 11:
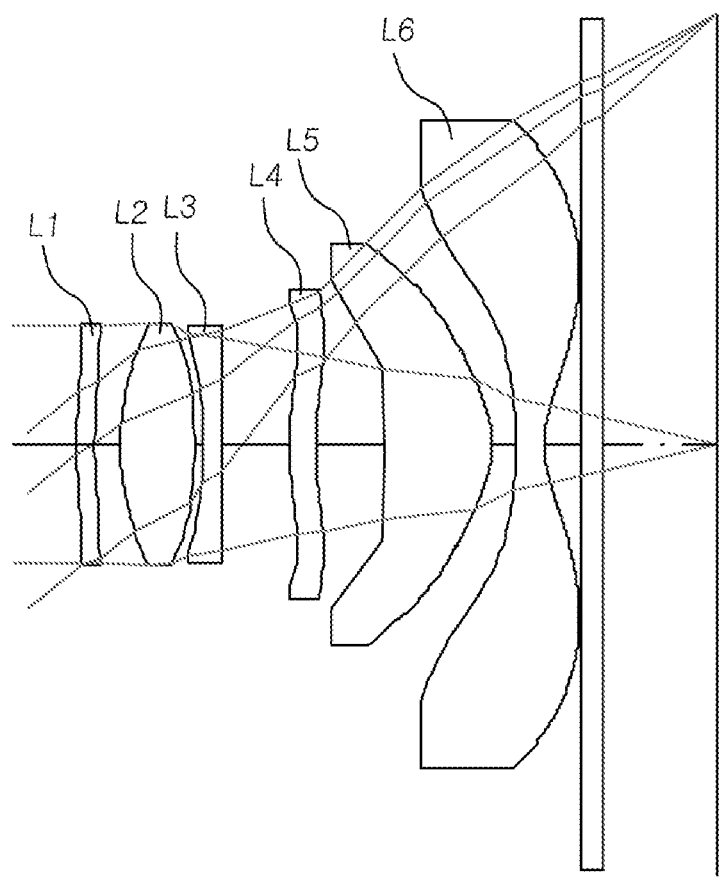
FIG. 11 is a view showing a fifth embodiment of the small lens system with alleviated sensitivity according to the present invention.
Figure 12:
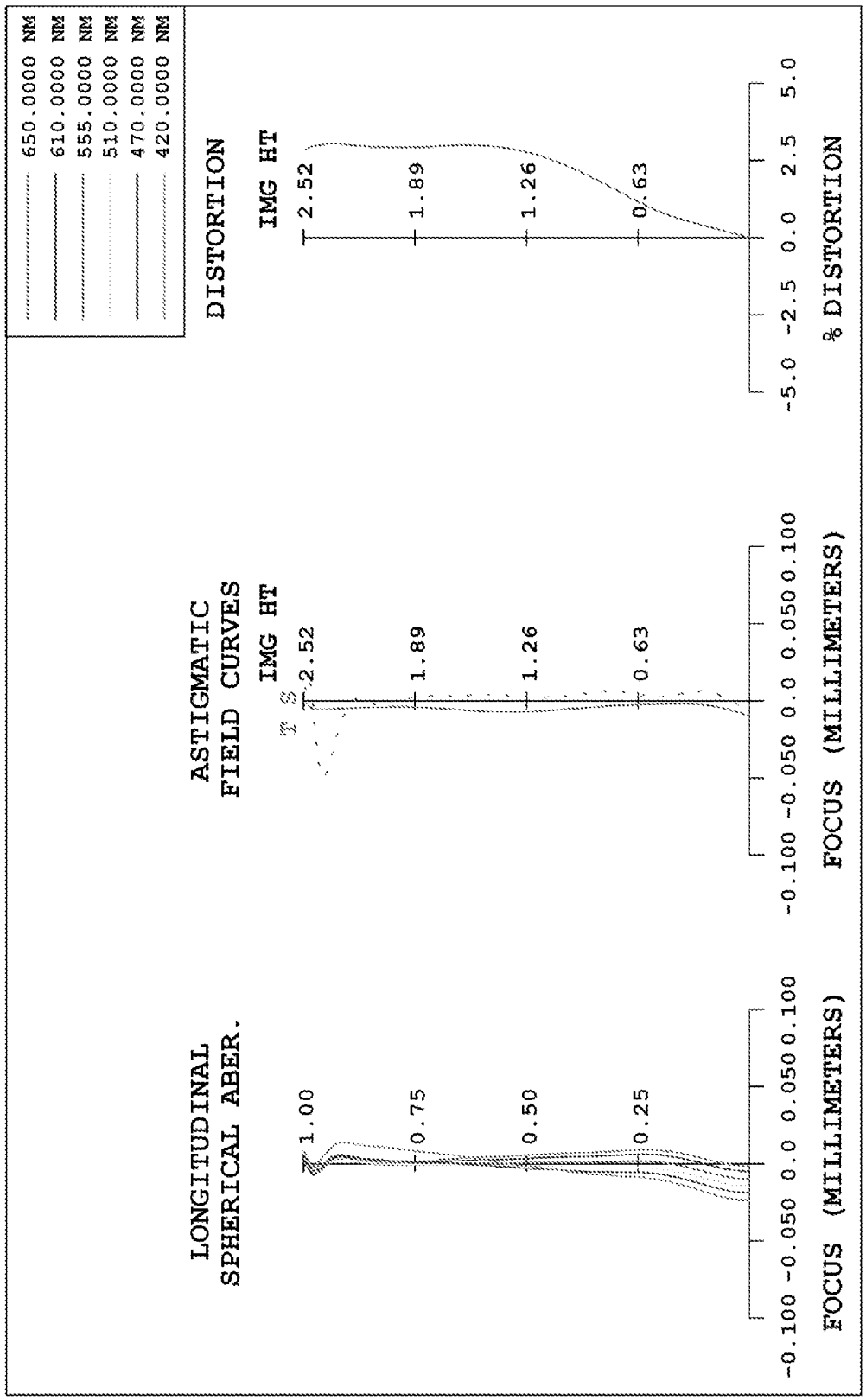
FIG. 12 is a view showing aberration according to a fifth embodiment of the present invention.

Hereinafter, the present invention will be described in detail with reference to the accompanying drawings. FIG. 3 is a view showing a first embodiment of a small lens system with alleviated sensitivity according to the present invention, FIG. 4 is a view showing aberration according to a first embodiment of the present invention FIG. 5 is a view showing a second embodiment of the small lens system with alleviated sensitivity according to the present invention, FIG. 6 is a view showing aberration according to a second embodiment of the present invention, FIG. 7 is a view showing a third embodiment of the small lens system with alleviated sensitivity according to the present invention, FIG. 8 is a view showing aberration according to a third embodiment of the present invention, FIG. 9 is a view showing a fourth embodiment of the small lens system with alleviated sensitivity according to the present invention, FIG. 10 is a view showing aberration according to a fourth embodiment of the present invention, FIG. 11 is a view showing a fifth embodiment of the small lens system with alleviated sensitivity according to the present invention, and FIG. 12 is a view showing aberration according to a fifth embodiment of the present invention.

As shown, the lens system according to the present invention includes a first lens L1, a second lens L2, a third lens L3, a fourth lens L4, a fifth lens L5, and a sixth lens L6 sequentially arranged from an object along an optical axis.

As shown, the present invention relates to a lens system including a first lens L1, a second lens L2, a third lens L3, a fourth lens L4, a fifth lens L5, and a sixth lens L6 sequentially arranged from an object, wherein the refractive power P1 of the first lens L1 satisfies −0.01<P1<0.01, an object-side surface and an image-side surface of the second lens L2 are convex, the refractive power P2 of the second lens L2 satisfies 0.4<P2, the third lens L3 has a negative refractive power, the curvature C6 of an image-side surface of the third lens L3 satisfies −0.01<C6<0.01, the refractive power P4 of the fourth lens L4 satisfies −0.1<P4<0.1, the refractive power P5 of the fifth lens L5 satisfies 0.7<P5, the refractive power P6 of the sixth lens L6 satisfies P6<−0.7, and the total optical path length (TOPL) of the lens system, which is the sum $$\left(TOPL = \sum_{n=1}^{16}(CTn \times Ndn)\right)$$

of values obtained by multiplying the distance from an object-side surface of the first lens L1 to an image sensor by the refractive powers of the respective lenses, and an image height (Himg) satisfy TOPL/Himg <1.8.

The refractive power of each lens is set, a stop is located at the first lens L1, the refractive power of the first lens L1 is very low, opposite surfaces of the second lens L2 are convex, and the second lens L2 has a high positive refractive power, whereby sensitivity of the lens system is alleviated.

In particular, the refractive power P1 of the first lens L1 satisfies |P1|<0.01, whereby an effective diameter of the first lens L1 may be reduced, and therefore a camera opening may be reduced. Consequently, it is possible to provide a small lens system.

In addition, the refractive power P1 of the first lens L1 satisfies |P1|<0.01, whereby the first lens may have a very low refractive power, and therefore tolerance sensitivity may be alleviated. Consequently, it is possible to provide a small lens system having excellent performance reproducibility.

In addition, breakage in shape of the first lens L1 is prevented when the first lens is processed, and the flow of a resin is smoothly maintained at the time of injection, whereby manufacturing tolerance is alleviated, and therefore performance reproducibility is further improved, which is advantageous in application to a small lens system.

In addition, the object-side surface and the image-side surface of the second lens L2 are convex, and the refractive power P2 of the second lens L2 satisfies 0.4<P2, whereby the second lens L2 is designed in order to alleviate sensitivity of the lens system together with the first lens L1.

In addition, the fourth lens L4 has a low refractive power, the fifth lens L5 has a high positive refractive power P5 satisfying 0.7<P5, and the sixth lens L6 has a high negative refractive power P6 satisfying P6<−0.7, whereby the length of the lenses is reduced, and the total optical path length (TOPL) of the lens system and the image height (Himg) satisfy TOPL/Himg <1.8, whereby TTL of the lens system is reduced, and therefore a small-thickness, high-performance lens system is provided.

In addition, the value of Sag SAG42 of an outermost side of an effective diameter of an image-side surface of the fourth lens L4 and the value of Sag SAG51 of an outermost side of an effective diameter of an object-side surface of the fifth lens L5 satisfy 0.1<|SAG42|+|SAG51| <0.5, whereby a small lens system is provided.

In addition, the lens thickness et1 at the height of an effective diameter of an image-side surface of the first lens L1 and the central thickness ct1 of the first lens L1 satisfy |et1−ct1|<0.07 mm, the lens thickness et4 at the height of an effective diameter of the image-side surface of the fourth lens L4 and the central thickness ct4 of the fourth lens L4 satisfy |et4−ct4|<0.05 mm, and the lens thickness et5 at the height of an effective diameter of an image-side surface of the fifth lens L5 and the central thickness ct5 of the fifth lens L5 satisfy |et5−ct5|>0.14 mm, whereby sensitivity of the lens system is reduced and the length between the lenses is reduced, which is advantageous in implementing a small lens system.

Also, in the lens system according to the present invention, the Abbe number V1 of the first lens L1, the Abbe number V2 of the second lens L2, the Abbe number V3 of the third lens L3, the Abbe number V4 of the fourth lens L4, the Abbe number V5 of the fifth lens L5, and the Abbe number V6 of the sixth lens L6 respectively satisfy 50<V1 <60, 50<V2<60, 15<V3<30, 15<V4<30, 50<V5<60; and 50<V6<60.

Since materials having high Abbe numbers and materials having low Abbe numbers are alternately used, chromatic aberration is corrected and performance is enhanced, which is advantageous in application to a small high-resolution lens system.

In addition, each of the first to sixth lenses L1 to L6 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having appropriately distributed Abbe numbers so as to be advantageous in correcting chromatic aberration.

As described above, the present invention relates to a lens system including a total of six lenses, more particularly to a lens system configured such that a first lens L1, a second lens L2, a third lens L3, a fourth lens L4, a fifth lens L5, and a sixth lens L6 are sequentially arranged from an object along an optical axis.

The present invention relates to a lens system configured such that a first lens L1, a second lens L2, a third lens L3, a fourth lens L4, a fifth lens L5, and a sixth lens L6 are sequentially arranged from an object along an optical axis, and has an effect of providing a small lens system configured such that sensitivity of the lens system is alleviated while the lens system is small and lightweight by appropriately designing the refractive power, shape, etc. of each lens.

In particular, the refractive power of each lens is set, a stop is located at the first lens L1, the refractive power of the first lens L1 is very low, opposite surfaces of the second lens L2 are convex, and the second lens L2 has a high positive refractive power, whereby sensitivity of the lens system is alleviated.

In addition, the fifth lens L5 has a high positive refractive power, and the sixth lens L6 has a high negative refractive power, whereby the length of the lenses is reduced, and the total optical path length (TOPL) of the lens system and an image height (Himg) satisfy TOPL/Himg <1.8, whereby TTL of the lens system is reduced, and therefore a small-thickness, high-performance lens system is provided.

Hereinafter, embodiments of the present invention will be described with reference to the accompanying drawings.

First Embodiment

FIG. 3 is a view showing a first embodiment of a small lens system with alleviated sensitivity according to the present invention.

As shown, a first lens L1, a second lens L2, a third lens L3, a fourth lens L4, a fifth lens L5, and a sixth lens L6 are sequentially arranged from an object on the optical axis. A stop is located between the first lens L1 and the second lens L2.

Table 1 below shows numerical data of the lenses constituting the lens system according to the first embodiment of the present invention.

TABLE 1

| Surface | Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 0.7145 |
| 2 | Qcon Asphere | 2.1199 | 0.1573 | 535000.5600 | 0.6900 |
| Stop | Qcon Asphere | 2.0649 | 0.0421 | | 0.6915 |
| 4 | Qcon Asphere | 1.3159 | 0.3975 | 544100.5600 | 0.6997 |
| 5 | Qcon Asphere | −7.3890 | 0.0718 | | 0.6906 |
| 6 | Qcon Asphere | −3.5406 | 0.1000 | 670000.1940 | 0.6500 |
| 7 | Qcon Asphere | Infinity | 0.3080 | | 0.6703 |
| 8 | Qcon Asphere | 1.6411 | 0.1039 | 670000.1940 | 0.7336 |
| 9 | Qcon Asphere | 1.8476 | 0.4178 | | 0.8005 |
| 10 | Qcon Asphere | 12.2632 | 0.4910 | 544100.5600 | 0.9800 |
| 11 | Qcon Asphere | −0.6224 | 0.0594 | | 1.3856 |
| 12 | Qcon Asphere | −3.9286 | 0.1400 | 535000.5600 | 1.6756 |
| 13 | Qcon Asphere | 0.5125 | 0.1412 | | 1.8240 |
| 14 | Sphere | Infinity | 0.1100 | BK7_SCHOTT | 2.1034 |
| 15 | Sphere | Infinity | 0.6204 | | 2.1436 |
| Image | Sphere | Infinity | −0.0004 | | 2.5200 |

As shown in FIG. 3, the first lens L1, the second lens L2, the third lens L3, the fourth lens L4, the fifth lens L5, and the sixth lens L6 are sequentially arranged from the object, and the Qcon polynomial of each lens based on Qcon asphere thereof is represented by Mathematical Expression 1 below.

$$z = \frac{cr^2}{1+\sqrt{1-(1+k)c^2r^2}} + n^4 \sum_{m=0}^{12} a_m Q_m^{con}(u^2)$$ [Mathematical Expression 1]

Here, z indicates sag of a surface parallel to a z axis in the lens system, c indicates the vertex curvature of the lens at the vertex thereof, k indicates a conic constant, r indicates radial distance of the lens from the axis thereof, $r_n$ indicates a normalization radius, u indicates $r/r_n$, $a_m$ indicates an m-th Qcon coefficient, and $Q_m^{con}$ indicates a m-th Qcon polynomial.

Qcon coefficients are obtained from Mathematical Expression 1 above as shown in Table 2 below.

TABLE 2

| Surface | 2 | Stop | 4 | 5 | 6 | 7 |
|---|---|---|---|---|---|---|
| Y Radius | 2.11986.E+00 | 2.06492.E+00 | 1.31591.E+00 | −7.38900.E+00 | −3.54059.E+00 | 1.00000.E+18 |
| Normalization Radius | 7.30000.E−01 | 7.38989.E−01 | 7.57518.E−01 | 7.50000.E−01 | 7.30000.E−01 | 8.33748.E−01 |
| K | −2.73434.E+01 | 6.83977.E+00 | 1.64834.E+00 | −4.02017.E+01 | 0.00000.E+00 | −7.16111.E+01 |
| 4th Qcon Coefficient | −6.42401.E−02 | −2.08364.E−01 | −1.25167.E−01 | −8.44660.E−02 | −1.81601.E−02 | −2.22981.E−04 |
| 6th Qcon Coefficient | 5.54240.E−03 | 1.05262.E−02 | −1.70173.E−02 | −3.34258.E−03 | 1.16324.E−02 | −2.07430.E−03 |
| 8th Qcon Coefficient | 3.060472.E−04 | −1.46624.E−02 | −2.15752.E−02 | −3.78845.E−03 | −1.08913.E−03 | −4.70635.E−03 |
| 10th Qcon Coefficient | −1.07669.E−03 | −4.20141.E−03 | −6.59068.E−03 | −3.05783.E−04 | 5.64648.E−04 | 2.78446.E−03 |
| 12th Qcon Coefficient | −1.75150.E−04 | −2.17066.E−03 | −3.42587.E−03 | 5.16650.E−04 | −4.90189.E−04 | 1.05363.E−03 |
| 14th Qcon Coefficient | −1.59503.E−04 | −1.07398.E−03 | −1.47164.E−03 | 8.09348.E−04 | −2.85522.E−04 | 3.86771.E−04 |
| 16th Qcon Coefficient | −1.60543.E−04 | −4.93826.E−04 | −5.21997.E−04 | 6.64208.E−04 | −3.56287.E−04 | −9.83859.E−04 |
| 18th Qcon Coefficient | −8.17499.E−05 | −1.89463.E−04 | −1.71501.E−04 | 4.63741.E−04 | −3.43586.E−04 | −1.30394.E−03 |
| 20th Qcon Coefficient | −3.61336.E−05 | −6.02364.E−05 | −5.32226.E−05 | 3.10170.E−04 | −2.62174.E−04 | −1.02300.E−03 |
| 22th Qcon Coefficient | — | — | — | 1.88053.E−04 | −1.92724.E−04 | −5.65535.E−04 |
| 24th Qcon Coefficient | — | — | — | 1.00787.E−04 | −1.22709.E−04 | −2.05367.E−04 |
| 26th Qcon Coefficient | — | — | — | 4.80312.E−05 | −6.94257.E−05 | −3.80397.E−05 |
| 28th Qcon Coefficient | — | — | — | 1.71679.E−05 | −3.18438.E−05 | 7.61425.E−07 |
| 30th Qcon Coefficient | — | — | — | 4.63084.E−06 | −9.92269.E−06 | 2.37904.E−06 |

| Surface | 8 | 9 | 10 | 11 | 12 | 13 |
|---|---|---|---|---|---|---|
| Y Radius | 1.84110.E+00 | 1.84765.E+00 | 1.22632.E+01 | −8.22449.E−01 | −3.92882.E+00 | 5.12524.E−01 |
| Normalization Radius | 7.29403.E−01 | 1.03743.E+00 | 1.16732.E+00 | 1.41667.E+00 | 1.70028.E+00 | 2.10194.E+00 |
| K | −5.89305.E+01 | 0.00000.E+00 | −8.58271.E+01 | −8.85307.E+00 | −9.42220.E+01 | −7.47071.E+00 |
| 4th Qcon Coefficient | −7.64768.E−02 | −3.95165.E−01 | −7.22869.E−01 | −4.25256.E−02 | −3.75179.E−01 | −1.59911.E+00 |
| 6th Qcon Coefficient | −3.17475.E−02 | 1.59701.E−01 | −2.86165.E−02 | −4.50155.E−02 | 2.05800.E−01 | 3.22295E−01 |
| 8th Qcon Coefficient | −3.20432.E−03 | 2.37235.E−02 | 4.85223.E−02 | 1.10572.E−02 | −1.19034.E−01 | 4.05956.E−02 |
| 10th Qcon Coefficient | −3.31435.E−03 | −2.86143.E−02 | −1.85380.E−02 | 1.61397.E−02 | 6.31997.E−02 | 2.00158.E−01 |
| 12th Qcon Coefficient | −2.80094.E−04 | −9.33670.E−03 | −1.10986.E−02 | −1.57367.E−02 | −4.63762.E−02 | 9.78422.E−02 |
| 14th Qcon Coefficient | −6.77790.E−04 | 1.85718E−02 | 2.52262.E−02 | −4.23417.E−03 | 2.01064.E−02 | 7.70551.E−02 |
| 16th Qcon Coefficient | −1.96108.E−04 | 1.17803.E−02 | 2.10557.E−02 | 7.42371.E−03 | 2.23548.E−03 | −1.25958.E−02 |
| 18th Qcon Coefficient | −2.41336.E−04 | −4.51539.E−03 | −1.01534.E−02 | −2.61673.E−04 | −7.42149.E−03 | −4.35006.E−02 |
| 20th Qcon Coefficient | −1.10992.E−04 | −6.63042.E−03 | −2.46672.E−02 | −2.35171.E−03 | 1.70470.E−03 | −4.94939.E−02 |
| 22th Qcon Coefficient | −8.70864.E−05 | 1.85744.E−03 | −1.56195.E−02 | −9.02733.E−04 | 1.71961.E−03 | −2.17704.E−02 |
| 24th Qcon Coefficient | −4.14322.E−05 | 7.38633.E−03 | −2.45951.E−03 | 6.04820.E−04 | −1.55480.E−03 | −5.10572.E−03 |
| 26th Qcon Coefficient | −2.55120.E−05 | 6.18886.E−03 | 2.57866.E−03 | 3.87551.E−04 | −2.15609.E−04 | 8.09247.E−04 |
| 28th Qcon Coefficient | −1.26075.E−05 | 2.63385.E−03 | 1.73832.E−03 | 4.52334.E−05 | 6.65963.E−04 | 3.98128.E−05 |
| 30th Qcon Coefficient | −8.09740.E−06 | 5.25914.E−04 | 3.78439.E−04 | −6.48228.E−05 | −6.49240.E−05 | 1.40938.E−04 |

According to the first embodiment of the present invention, the refractive power P1 of the first lens L1 satisfies P1=−0.232e−10, the refractive power P2 of the second lens L2 satisfies P2=0.481, the refractive power P4 of the fourth lens L4 satisfies P4=0.055, the refractive power P5 of the fifth lens L5 satisfies P5=0.909, and the refractive power P6 of the sixth lens L6 satisfies P6=−1.197.

In addition, according to the first embodiment of the present invention, the total optical path length (TOPL) of the lens system, which is the sum of values obtained by multiplying the distance from the object-side surface of the first lens L1 to the image sensor by the refractive powers of the respective lenses, satisfies $$TOPL = \sum_{n=1}^{16}(CTn \times Ndn) = 3.939.$$

In addition, the total optical path length (TOPL) and the image height (Himg) satisfy TOPL/Himg=1.563.

In addition, according to the first embodiment of the present invention, the value of Sag SAG42 of the outermost side of the effective diameter of the image-side surface of the fourth lens L4 and the value of Sag SAG51 of the outermost side of the effective diameter of the object-side surface of the fifth lens L5 satisfy |SAG42|+|SAG51|=0.4, and the curvature C6 of the image-side surface of the third lens L3 satisfies C6=0.1e−17.

In addition, according to the first embodiment of the present invention, the lens thickness et1 at the height of the effective diameter of the image-side surface of the first lens L1 and the central thickness ct1 of the first lens L1 satisfy |et1−ct1|=0.007, the lens thickness et4 at the height of the effective diameter of the image-side surface of the fourth lens L4 and the central thickness ct4 of the fourth lens L4 satisfy |et4−ct4|=0.016, and the lens thickness et5 at the height of the effective diameter of the image-side surface of the fifth lens L5 and the central thickness ct5 of the fifth lens L5 satisfy |et5−ct5|=0.154.

FIG. 4 is a view showing aberration according to a first embodiment of the present invention.

First data of FIG. 4 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 4 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 4 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 5 is a view showing a second embodiment of the small lens system with alleviated sensitivity according to the present invention.

As shown, a first lens L1, a second lens L2, a third lens L3, a fourth lens L4, a fifth lens L5, and a sixth lens L6 are sequentially arranged from an object on the optical axis. A stop is located between the first lens L1 and the second lens L2.

Table 3 below shows numerical data of the lenses constituting the optical system according to the second embodiment of the present invention.

TABLE 3

|  | Surface Type | Y Radius | Thickness | Glass Code | Y Semi-Aperture |
|---|---|---|---|---|---|
| Object | Sphere | Infinity | Infinity |  |  |
| 1 | Sphere | Infinity | 0.0000 |  | 0.7308 |
| 2 | Qcon Asphere | 2.5613 | 0.1000 | 535000.5600 | 0.7100 |
| Stop | Qcon Asphere | 2.5264 | 0.1284 |  | 0.6914 |
| 4 | Qcon Asphere | 1.4644 | 0.4113 | 544100.5600 | 0.7094 |
| 5 | Qcon Asphere | −4.0313 | 0.0500 |  | 0.6907 |
| 6 | Qcon Asphere | −2.9268 | 0.1000 | 640000.2340 | 0.6540 |
| 7 | Qcon Asphere | Infinity | 0.3600 |  | 0.6901 |
| 8 | Qcon Asphere | 1.8469 | 0.1314 | 670000.1940 | 0.8168 |
| 9 | Qcon Asphere | 1.7843 | 0.3775 |  | 0.8826 |
| 10 | Qcon Asphere | 34.2167 | 0.5774 | 544100.5600 | 0.9700 |
| 11 | Qcon Asphere | −0.6075 | 0.1223 |  | 1.2133 |
| 12 | Qcon Asphere | −2.0283 | 0.1400 | 535000.5600 | 1.4904 |
| 13 | Qcon Asphere | 0.6470 | 0.1716 |  | 1.8955 |
| 14 | Sphere | Infinity | 0.1100 | BK7_SCHOTT | 2.2067 |
| 15 | Sphere | Infinity | 0.6100 |  | 2.2475 |
| Image | Sphere | Infinity | 0.0100 |  | 2.5200 |

As shown in FIG. 5, the first lens L1, the second lens L2, the third lens L3, the fourth lens L4, the fifth lens L5, and the sixth lens L6 are sequentially arranged from the object, and the Qcon polynomial of each lens based on Qcon asphere thereof is represented by Mathematical Expression 1 above.

Qcon coefficients are obtained from Mathematical Expression 1 above as shown in Table 4 below.

TABLE 4

| Surface | 2 | Stop | 4 | 5 | 6 | 7 |
|---|---|---|---|---|---|---|
| Y Radius | 2.56135.E+00 | 2.52642.E+00 | 1.46442.E+00 | −4.03126.E+00 | −2.92680.E+00 | 1.00000.E+18 |
| Normalization Radius | 7.30000.E−01 | 7.38989.E−01 | 7.99362.E−01 | 7.50000.E−01 | 7.30000.E−01 | 8.337490E−01 |
| K | −2.79001.E−01 | 1.03413.E+01 | 2.21262.E+00 | 2.75671.E+00 | 0.00000E+00 | −7.16111.E+01 |
| 4th Qcon Coefficient | −6.04104.E−02 | −1.41845.E−01 | −1.07499.E−01 | −6.57364.E−02 | −1.34002.E−02 | 4.02475.E−03 |
| 6th Qcon Coefficient | 7.29635.E−03 | 6.68887.E−03 | −1.09418.E−02 | 8.62415.E−03 | 1.58170.E−03 | −1.33817.E−02 |
| 8th Qcon Coefficient | −3.46219.E−04 | −5.70441.E−03 | −4.25071.E−03 | 1.45624.E−03 | −6.48523.E−04 | 4.45351.E−04 |
| 10th Qcon Coefficient | −3.18956.E−04 | −1.73410.E−03 | −2.48214.E−04 | 1.14252.E−03 | −2.15808.E−04 | 1.77691.E−03 |
| 12th Qcon Coefficient | −4.16535.E05 | −6.64481.E−04 | −3.81525.E−04 | 3.58127.E−04 | −8.87213.E−04 | 2.31012.E−04 |
| 14th Qcon Coefficient | −3.38414.E−05 | −2.28723.E−04 | −3.92041.E−04 | 4.10270.E−04 | −3.02523.E−04 | −5.20084.E−04 |
| 16th Qcon Coefficient | −3.08271.E−05 | −5.71519.E−05 | −2.27952.E−04 | 3.45596.E−04 | −2.3613.E−04 | −1.27220.E−03 |
| 18th Qcon Coefficient | −1.42076.E−05 | −5.82286.E−06 | −8.51312.E−05 | 3.39071.E−04 | −1.51501.E−04 | −9.81503.E−04 |
| 20th Qcon Coefficient | −1.40438.E−06 | 8.17799.E−06 | −1.64975.E−05 | 3.10529.E−04 | −7.50032.E−05 | −5.13078.E−04 |
| 22th Qcon Coefficient | — | — | — | 2.43940.E−04 | −2.41267.E−05 | −1.28298.E−04 |
| 24th Qcon Coefficient | — | — | — | 1.61423.E−04 | −1.11805.E−05 | 3.84875.E−05 |

TABLE 4-continued

| | | | | | | |
|---|---|---|---|---|---|---|
| 26th Qcon Coefficient | — | — | — | 9.95879.E−05 | 8.14583.E−06 | 5.57810.E−05 |
| 28th Qcon Coefficient | — | — | — | 4.57168.E−05 | 5.45146.E−06 | 1.79874.E−05 |
| 30th Qcon Coefficient | — | — | — | 1.39752.E−05 | 4.49935.E−06 | 1.52807.E−06 |

| Surface | 8 | 9 | 10 | 11 | 12 | 13 |
|---|---|---|---|---|---|---|
| Y Radius | 1.84685.E+00 | 1.78434.E+00 | 3.42157.E+01 | −6.07545.E−01 | −2.02833.E+00 | 6.47022.E−01 |
| Normalization Radius | 7.93615.E−01 | 1.03743.E+00 | 1.16732.E+00 | 1.41667.E+00 | 1.70028.E+00 | 2.10194.E+00 |
| K | −5.89305.E+01 | 0.00000.E+00 | −8.58271.E+01 | −6.13320.E+00 | −9.42220.E+01 | −4.94343.E+00 |
| 4th Qcon Coefficient | −6.06815.E+02 | −3.86713.E−01 | −6.77942.E−01 | −3.74515.E−01 | −7.64951.E−01 | −1.74104.E+00 |
| 6th Qcon Coefficient | −1.55337.E−02 | 6.40493.E−02 | −9.93101.E−02 | 9.16217.E−02 | 2.83287.E−01 | 2.17446.E−01 |
| 8th Qcon Coefficient | 1.75935.E−03 | 5.74747.E−03 | 2.97555.E−02 | 9.01284.E−02 | −1.22308.E−01 | −8.33999.E−02 |
| 10th Qcon Coefficient | −1.46039.E−03 | 1.48314.E−03 | 1.59753.E−02 | 4.45540.E−02 | 1.01485.E−02 | 1.20756.E−01 |
| 12th Qcon Coefficient | −5.68402.E−05 | 1.81021.E−03 | 2.53625.E−04 | 1.14296.E−02 | 1.08383.E−02 | 6.89421.E−02 |
| 14th Qcon Coefficient | −4.34471.E−04 | 5.56221.E−03 | 9.97788.E−03 | −3.96078.E−03 | −7.55670.E−03 | 8.07603.E−02 |
| 16th Qcon Coefficient | −8.26906.E−05 | 3.40943.E−03 | 1.13306.E−02 | −1.79881.E−02 | −1.17260.E−02 | 2.34168.E−02 |
| 18th Qcon Coefficient | −9.11119.E−05 | 1.63947.E−03 | −2.42484.E−03 | −1.47736.E−02 | −7.23864.E−03 | −3.28138.E−03 |
| 20th Qcon Coefficient | −2.22621.E−05 | 1.28032.E−03 | −1.59219.E−02 | 2.70190.E−03 | −3.38662.E−03 | −2.58383.E−02 |
| 22th Qcon Coefficient | −1.53839.E−05 | 1.70043.E−03 | −1.81315.E−02 | 1.43757.E−02 | −4.82584.E−03 | −2.26509.E−02 |
| 24th Qcon Coefficient | −8.54024.E−06 | 1.57521.E−03 | −1.20727.E−02 | 1.35734.E−02 | −3.50672.E−03 | −1.49610.E−02 |
| 26th Qcon Coefficient | −1.03987.E−06 | 1.00254.E−03 | −5.23416.E−03 | 7.11346.E−03 | −3.97780.E−03 | −5.69551.E−03 |
| 28th Qcon Coefficient | −3.44142.E−06 | 4.03701.E−04 | −1.43166.E−03 | 2.22400.E−03 | −2.53444.E−03 | −1.66976.E−03 |
| 30th Qcon Coefficient | 1.35372.E−06 | 9.59306.E−05 | −1.91978.E−04 | 3.74170.E−04 | −1.21221.E−03 | −1.19166.E−04 |

According to the second embodiment of the present invention, the refractive power P1 of the first lens L1 satisfies P1=0.201e−11, the refractive power P2 of the second lens L2 satisfies P2=0.495, the refractive power P4 of the fourth lens L4 satisfies P4=−0.002, the refractive power P5 of the fifth lens L5 satisfies P5=0.909, and the refractive power P6 of the sixth lens L6 satisfies P6=−1.114.

In addition, according to the second embodiment of the present invention, the total optical path length (TOPL) of the lens system, which is the sum of values obtained by multiplying the distance from the object-side surface of the first lens L1 to the image sensor by the refractive powers of the respective lenses, satisfies $$TOPL = \sum_{n=1}^{16}(CTn \times Ndn) = 4.218.$$

In addition, the total optical path length (TOPL) and the image height (Himg) satisfy TOPL/Himg=1.674.

In addition, according to the second embodiment of the present invention, the value of Sag SAG42 of the outermost side of the effective diameter of the image-side surface of the fourth lens L4 and the value of Sag SAG51 of the outermost side of the effective diameter of the object-side surface of the fifth lens L5 satisfy |SAG42|+|SAG51|=0.29, and the curvature C6 of the image-side surface of the third lens L3 satisfies C6=0.1e−17.

In addition, according to the second embodiment of the present invention, the lens thickness et1 at the height of the effective diameter of the image-side surface of the first lens L1 and the central thickness ct1 of the first lens L1 satisfy |et1−ct1|=0.009, the lens thickness et4 at the height of the effective diameter of the image-side surface of the fourth lens L4 and the central thickness ct4 of the fourth lens L4 satisfy |et4−ct4|=0.016, and the lens thickness et5 at the height of the effective diameter of the image-side surface of the fifth lens L5 and the central thickness ct5 of the fifth lens L5 satisfy |et5−ct5|=0.4.

FIG. 6 is a view showing aberration according to a second embodiment of the present invention.

First data of FIG. 6 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 6 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 6 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 7 is a view showing a third embodiment of the small lens system with alleviated sensitivity according to the present invention.

As shown, a first lens L1, a second lens L2, a third lens L3, a fourth lens L4, a fifth lens L5, and a sixth lens L6 are sequentially arranged from an object on the optical axis. A stop is located between the first lens L and the second lens L2.

Table 5 below shows numerical data of the lenses constituting the optical system according to the third embodiment of the present invention.

TABLE 5

| | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 0.7270 |
| 2 | Qcon Asphere | 2.5725 | 0.1000 | 535000.5600 | 0.7100 |
| Stop | Qcon Asphere | 2.5375 | 0.1306 | | 0.7094 |
| 4 | Qcon Asphere | 1.6720 | 0.3975 | 544100.5600 | 0.7257 |
| 5 | Qcon Asphere | −3.6487 | 0.1010 | | 0.7162 |
| 6 | Qcon Asphere | −2.7843 | 0.1300 | 634000.2390 | 0.6540 |
| 7 | Qcon Asphere | Infinity | 0.3132 | | 0.7044 |
| 8 | Qcon Asphere | 2.3376 | 0.1545 | 670000.1940 | 0.8168 |
| 9 | Qcon Asphere | 2.1658 | 0.3824 | | 0.8995 |
| 10 | Qcon Asphere | −6.0252 | 0.4785 | 544100.5600 | 1.0000 |
| 11 | Qcon Asphere | −0.5614 | 0.1372 | | 1.1652 |
| 12 | Qcon Asphere | −2.0165 | 0.2456 | 535000.5600 | 1.6453 |
| 13 | Qcon Asphere | 0.7453 | 0.2794 | | 2.0730 |
| 14 | Sphere | Infinity | 0.1100 | BK7_SCHOTT | 2.2496 |
| 15 | Sphere | Infinity | 0.6100 | | 2.2858 |
| Image | Sphere | Infinity | 0.0100 | | 2.5200 |

As shown in FIG. 7, the first lens L1, the second lens L2, the third lens L3, the fourth lens L4, the fifth lens L5, and the sixth lens L6 are sequentially arranged from the object, and the Qcon polynomial of each lens based on Qcon asphere thereof is represented by Mathematical Expression 1 above.

Qcon coefficients are obtained from Mathematical Expression 1 above as shown in Table 6 below.

TABLE 6

| Surface | 2 | Stop | 4 | 5 | 6 | 7 |
|---|---|---|---|---|---|---|
| Y Radius | 2.57247.E+00 | 2.53754.E+00 | 1.57195.E+00 | −3.64872.E+00 | −2.78434.E+00 | 1.00000.E+18 |
| Normalization Radius | 7.30000.E−01 | 7.38989.E−01 | 8.07361.E−01 | 7.50000.E−01 | 7.30000.E−01 | 8.33748.E−01 |
| K | −2.65340.E+01 | 1.07604.E+01 | 2.60738.E+00 | −5.12861.E−01 | 0.00000.E+00 | −7.16111.E+01 |
| 4th Qcon Coefficient | −6.27780.E−02 | −1.53353.E−01 | −9.91216.E−02 | −6.19386.E+02 | −1.52779.E−02 | −1.37772.E−02 |
| 6th Qcon Coefficient | 3.10334.E−03 | −2.23730.E−03 | −7.12531.E−03 | −1.35876.E−03 | −5.20902.E−03 | −1.79318.E−02 |
| 8th Qcon Coefficient | 5.83589.E−04 | −5.86991.E−03 | 8.28016.E−04 | 2.12215.E−03 | 2.23470.E−03 | 2.64695.E−03 |
| 10th Qcon Coefficient | −2.27840.E−04 | −3.06786.E−03 | 2.20250.E−03 | 5.21734.E−04 | −1.10554.E−03 | 4.30024.E−04 |
| 12th Qcon Coefficient | −3.97946.E−05 | −1.54182.E−03 | 1.43630.E−03 | 3.21382.E−04 | −1.23221.E−04 | 9.64743.E−04 |
| 14th Qcon Coefficient | −4.61474.E−05 | −7.91587.E−04 | 6.34073.E−04 | 6.25713.E−04 | −2.98252.E−04 | −4.85192.E−04 |
| 16th Qcon Coefficient | −4.987.88.E−05 | −4.07137.E−04 | 2.43474.E−04 | 4.99891.E−04 | −2.82326.E−04 | −9.09019.E−04 |
| 18th Qcon Coefficient | −3.49469.E−05 | −1.71602.E−04 | 7.97533.E−05 | 3.93648.E−04 | −2.28753.E−04 | −9.68338.E−04 |
| 20th Qcon Coefficient | −1.76321.E−05 | −5.95317.E−05 | 2.00665.E−05 | 2.88658.E−04 | −1.83984.E−04 | −7.54007.E−04 |
| 22th Qcon Coefficient | — | — | — | 1.99607.E−04 | −1.16396.E−04 | −4.82638.E−04 |
| 24th Qcon Coefficient | — | — | — | 1.24703.E−04 | −6.76773.E−05 | −2.61203.E−04 |
| 26th Qcon Coefficient | — | — | — | 7.36478.E−05 | −2.72553.E−05 | −1.24250.E−04 |
| 28th Qcon Coefficient | — | — | — | 3.65122.E−05 | −9.90030.E−06 | −4.75062.E−05 |
| 30th Qcon Coefficient | — | — | — | 1.13354.E−05 | 6.55853.E−07 | −1.29121.E−05 |

| Surface | 8 | 9 | 10 | 11 | 12 | 13 |
|---|---|---|---|---|---|---|
| Y Radius | 2.33758.E+00 | 2.16580.E+00 | −6.02521.E+00 | −5.61356.E−01 | −2.01649.E+00 | 7.45324.E−01 |
| Normalization Radius | 8.19232.E−01 | 1.03743.E+00 | 1.16732.E+00 | 1.41557.E+00 | 1.70028.E+00 | 2.10194.E+00 |
| K | −5.89305.E+01 | 0.00000.E+00 | −8.58271.E+01 | −6.59096.E+00 | −9.42220.E+01 | −3.19771.E+00 |
| 4th Qcon Coefficient | −4.04419.E−02 | −2.54213.E−01 | −4.37154.E−01 | −5.26698.E−01 | −2.73131.E−01 | −1.55764.E+00 |
| 6th Qcon Coefficient | −1.45925.E−02 | 4.12711.E−02 | −5.62688.E−02 | 1.77222.E−02 | 6.29338.E−02 | 2.17243.E−01 |
| 8th Qcon Coefficient | 1.97260.E−03 | 1.19620.E−02 | 2.79009.E−04 | −6.16299.E−03 | −2.30051.E−03 | −1.14213.E−01 |
| 10th Qcon Coefficient | −1.00530.E−03 | 1.06268.E−03 | 1.59662.E−03 | 7.44698.E−02 | −2.04080.E−02 | 4.15200.E−02 |
| 12th Qcon Coefficient | −1.23831.E−04 | 9.35044.E−04 | 1.04290.E−02 | 4.37293.E−02 | 1.70040.E−02 | −3.50240.E−03 |
| 14th Qcon Coefficient | −1.83354.E−04 | 4.03221.E−03 | 2.04534.E−02 | 9.10838.E−03 | −8.36071.E−03 | 2.28704.E−02 |
| 16th Qcon Coefficient | −5.48970.E−05 | 3.82711.E−03 | 6.92316.E−03 | −3.76037.E−01 | 4.73322.E−03 | 9.88194.E−03 |
| 18th Qcon Coefficient | −1.68400.E−05 | 2.91337.E−03 | −1.13822.E−02 | −2.80096.E−02 | −1.94020.E−03 | 1.21151.E−01 |
| 20th Qcon Coefficient | −1.34236.E−05 | 2.04224.E−03 | −1.8140.E−02 | 4.11292.E−04 | 1.63748.E−03 | 5.66880.E−03 |
| 22th Qcon Coefficient | 8.65003.E−06 | 1.68058.E−03 | −1.25199.E−02 | 2.19454.E−02 | −1.69917.E−03 | 2.50370.E−03 |
| 24th Qcon Coefficient | −5.62579.E−06 | 1.24141.E−03 | −4.84646.E−03 | 2.34922.E−02 | 4.00237.E−04 | −2.05989.E−04 |
| 26th Qcon Coefficient | 3.04958.E−08 | 7.71965.E−04 | −4.65557.E−04 | 1.88448.E−02 | −1.90429.E−04 | −8.88517.E−04 |
| 28th Qcon Coefficient | −2.99752.E−05 | 3.15534.E−04 | 4.57616.E−04 | 7.59480.E−03 | 9.15026.E−05 | −4.99325.E−04 |
| 30th Qcon Coefficient | 2.89486.E−06 | 8.37659.E−05 | 2.25514.E−04 | 2.05740.3−03 | −2.10654.E−04 | −2.20681.E−04 |

According to the third embodiment of the present invention, the refractive power P1 of the first lens L1 satisfies P1=−0.169e−13, the refractive power P2 of the second lens L2 satisfies P2=0.464, the refractive power P4 of the fourth lens L4 satisfies P4=−0.015, the refractive power P5 of the fifth lens L5 satisfies P5=0.909, and the refractive power P6 of the sixth lens L6 satisfies P6=−1.017.

In addition, according to the third embodiment of the present invention, the total optical path length (TOPL) of the lens system, which is the sum of values obtained by multiplying the distance from the object-side surface of the first lens L1 to the image sensor by the refractive powers of the respective lenses, satisfies $$TOPL = \sum_{n=1}^{16}(CTn \times Ndn) = 4.428.$$

in addition, the total optical path length (TOPL) and the image height (Himg) satisfy TOPL/Himg=1.757.

In addition, according to the third embodiment of the present invention, the value of Sag SAG42 of the outermost side of the effective diameter of the image-side surface of the fourth lens L4 and the value of Sag SAG51 of the outermost side of the effective diameter of the object-side surface of the fifth lens L5 satisfy |SAG42|+|SAG51|=0.30, and the curvature C6 of the image-side surface of the third lens L3 satisfies C6=0.1e−17.

In addition, according to the third embodiment of the present invention, the lens thickness et1 at the height of the effective diameter of the image-side surface of the first lens L1 and the central thickness ct1 of the first lens L1 satisfy |et1−ct1|=0.006, the lens thickness et4 at the height of the effective diameter of the image-side surface of the fourth lens L4 and the central thickness ct4 of the fourth lens L4 satisfy |et4−ct4|=0.015, and the lens thickness et5 at the height of the effective diameter of the image-side surface of the fifth lens L5 and the central thickness ct5 of the fifth lens L5 satisfy |et5−ct5|=0.337.

FIG. 8 is a view showing aberration according to a third embodiment of the present invention.

First data of FIG. 8 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the third embodiment of the present invention is 0.025 mm (focus) or less, which is determined to be good.

Second data of FIG. 8 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the third embodiment of the present invention is 0.025 mm (focus) or less, which is determined to be good.

Third data of FIG. 8 show distortion aberration, wherein the horizontal axis indicates distortion degree (%), and the vertical axis indicates image height (mm). In general, it is known that, in the case in which an aberration curve is within a range of −2 to 2%, distortion aberration is good.

Optical distortion, as the distortion aberration according to the third embodiment of the present invention, is 2% or less, which is determined to be good.

Fourth Embodiment

FIG. 9 is a view showing a fourth embodiment of the small lens system with alleviated sensitivity according to the present invention.

As shown, a first lens L1, a second lens L2, a third lens L3, a fourth lens L4, a fifth lens L5, and a sixth lens L6 are sequentially arranged from an object on the optical axis. A stop is located between the first lens L1 and the second lens L2.

Table 7 below shows numerical data of the lenses constituting the optical system according to the fourth embodiment of the present invention.

TABLE 7

| Surface | Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 0.7154 |
| 2 | Qcon Asphere | 2.1555 | 0.1598 | 535000.5600 | 0.6900 |
| Stop | Qcon Asphere | 2.0997 | 0.0500 | | 0.6923 |
| 4 | Qcon Asphere | 1.3069 | 0.3895 | 544100.5600 | 0.7007 |
| 5 | Qcon Asphere | −9.0425 | 0.0763 | | 0.6962 |
| 6 | Qcon Asphere | −3.8328 | 0.1000 | 680000.1850 | 0.6540 |
| 7 | Qcon Asphere | Infinity | 0.3084 | | 0.6732 |
| 8 | Qcon Asphere | 1.6475 | 0.1059 | 670000.1940 | 0.7789 |
| 9 | Qcon Asphere | 1.8441 | 0.4125 | | 0.7988 |
| 10 | Qcon Asphere | 10.9167 | 0.4886 | 544100.5600 | 0.9700 |
| 11 | Qcon Asphere | −0.6254 | 0.0588 | | 1.4028 |
| 12 | Qcon Asphere | −3.7977 | 0.1400 | 535000.5600 | 1.6880 |
| 13 | Qcon Asphere | 0.5150 | 0.1404 | | 1.8800 |
| 14 | Sphere | Infinity | 0.1100 | BK7_SCHOTT | 2.1716 |
| 15 | Sphere | Infinity | 0.6242 | | 2.2145 |
| Image | Sphere | Infinity | −0.0042 | | 2.5200 |

As shown in FIG. 9, the first lens L1, the second lens L2, the third lens L3, the fourth lens L4, the fifth lens L5, and the sixth lens L6 are sequentially arranged from the object, and the Qcon polynomial of each lens based on Qcon asphere thereof is represented by Mathematical Expression 1 above.

Qcon coefficients are obtained from Mathematical Expression 1 above as shown in Table 8 below.

TABLE 8

| Surface | 2 | Stop | 4 | 5 | 6 | 7 |
|---|---|---|---|---|---|---|
| Y Radius | 2.15554.E+00 | 2.09973.E+00 | 1.30688.E+00 | −9.04247.E+00 | −3.83285.E+00 | 1.00000.E+18 |
| Normalization Radius | 7.30000.E−01 | 7.38989.E−01 | 7.55296.E−01 | 7.50000.E−01 | 7.30000.E−01 | 8.33748E−01 |
| K | −2.72644.E+01 | 7.00902.E+00 | 1.59656.E+00 | 3.14762.E+00 | 0.00000.E+00 | −7.16111.E+01 |
| 4th Qcon Coefficient | −6.39040.E−02 | −2.03624.E−01 | −1.29688.E−01 | −8.67654.E−02 | −1.93628.E−02 | 8.45893.E−04 |
| 6th Qcon Coefficient | 5.56078.E−03 | 1.12744.E−02 | −1.82959.E−02 | −4.45082.E−03 | 1.22913.E−02 | 8.75718.E−04 |
| 8th Qcon Coefficient | 3.78078.E−04 | −1.28015.E−02 | −2.06562.E−02 | −4.46481.E−03 | −1.23561.E−03 | −4.18074.E−03 |
| 10th Qcon Coefficient | −9.88355.E−04 | −3.59552.E−03 | −6.45011.E−03 | −9.54623.E−04 | 5.88664.E−04 | 2.41670.E−03 |
| 12th Qcon Coefficient | −1.95461.E−04 | −1.77879.E−03 | −3.09088.E−03 | 2.44207.E−04 | −6.49225.E−04 | 4.85702.E−04 |
| 14th Qcon Coefficient | −1.62396.E−04 | −8.71967.E−04 | −1.31365.E−03 | 5.46931.E−04 | −4.02343.E−04 | 2.40057.E−04 |
| 16th Qcon Coefficient | −1.48140.E−04 | −3.90736.E−04 | −4.55351.E−04 | 4.66925.E−04 | −4.03333.E−04 | −8.29957.E−04 |
| 18th Qcon Coefficient | −7.56359.E−05 | −1.45744.E−04 | −1.44561.E−04 | 3.41349.E−04 | −3.51567.E−04 | −1.07345.E−03 |
| 20th Qcon Coefficient | −2.98114.E−05 | −4.23925.E−05 | −4.08411.E−05 | 2.30447.E−04 | −2.52423.E−04 | −8.76324.E−04 |
| 22th Qcon Coefficient | — | — | — | 1.48934.E−04 | −1.71712.E−04 | −5.45910.E−04 |
| 24th Qcon Coefficient | — | — | — | 8.13987.E−05 | −1.03088.E−04 | −2.59425.E−04 |
| 26th Qcon Coefficient | — | — | — | 4.37838.E−05 | −5.48662.E−05 | −9.15981.E−05 |
| 28th Qcon Coefficient | — | — | — | 1.81562.E−05 | −2.40155.E−05 | −2.39356.E−05 |
| 30th Qcon Coefficient | — | — | — | 6.96271.E−06 | −7.18929.E−06 | −2.01962.E−06 |

| Surface | 8 | 9 | 10 | 11 | 12 | 13 |
|---|---|---|---|---|---|---|
| Y Radius | 1.64755.E+00 | 1.84412.E+00 | 1.09167.E+01 | −6.25370.E−01 | −3.79772.E+00 | 5.14971.E−01 |
| Normalization Radius | 7.31049.E−01 | 1.03713.E+00 | 1.16732.E+00 | 1.41667.E+00 | 1.70028.E+00 | 2.10194.E+00 |
| K | −5.89305.E+01 | 0.00000.E+00 | −8.58271.E+01 | −8.83088.E+00 | −9.42220.E+01 | −7.41844.E+00 |
| 4th Qcon Coefficient | −7.73940.E−02 | −3.94166.E−01 | −7.39227.E−01 | −2.36669.E−02 | −3.67676.E−01 | −1.61151.E+00 |
| 6th Qcon Coefficient | −3.14930.E−02 | 1.61179.E−01 | −2.89531.E−02 | −4.32083.E−02 | 2.06744.E−01 | 3.37107.E−07 |
| 8th Qcon Coefficient | −3.33044.E−03 | 2.36765.E−02 | 4.62978.E−02 | 1.01348.E−02 | −1.17615.E−01 | 5.09139.E−02 |
| 10th Qcon Coefficient | −3.20365.E−03 | −2.84676.E−02 | −1.97635.E−02 | 1.45875.E−02 | 6.35640.E−02 | 2.03080.E−01 |
| 12th Qcon Coefficient | −1.81726.E−04 | −9.73164.E−03 | −1.04122.E−02 | −1.41109.E−02 | −4.55574.E−02 | 9.57299.E−02 |
| 14th Qcon Coefficient | −6.09423.E−04 | 1.85792.E−02 | 2.51857.E−02 | −4.13173.E−03 | 2.05957.E−02 | 7.46232.E−02 |
| 16th Qcon Coefficient | −1.46147.E−04 | 1.20662.E−02 | 2.05683.E−02 | 8.14856.E−03 | 1.98464.E−03 | −1.62844.E−02 |
| 18th Qcon Coefficient | −2.09242.E−04 | −4.43702.E−03 | −1.00706.E−02 | −8.73629.E−04 | −7.96291.E−03 | −4.50587.E−02 |
| 20th Qcon Coefficient | −8.94256.E−05 | −6.75750.E−03 | −2.41277.E−02 | −2.01506.E−03 | 3.04552.E−03 | −4.79432.E−02 |
| 22th Qcon Coefficient | −7.35684.E−05 | 1.81340.E−03 | −1.55816.E−02 | −4.20937.E−04 | 1.18736.E−03 | −1.99236.E−02 |
| 24th Qcon Coefficient | −3.14298.E−05 | 7.54686.E−03 | −3.20946.E−03 | 5.53002.E−04 | −1.51974.E−03 | −4.08778.E−03 |
| 26th Qcon Coefficient | −1.87159.E−05 | 6.39952.E−03 | 1.71453.E−03 | 2.49185.E−04 | 1.49377.E−05 | 1.22238.E−03 |
| 28th Qcon Coefficient | −8.96997.E−06 | 2.75197.E−03 | 1.28051.E−03 | 2.32626.E−05 | 5.85408.E−04 | 4.43502.E−04 |
| 30th Qcon Coefficient | −6.11971.E−06 | 5.53239.E−04 | 2.72123.E−04 | −6.09468.E−05 | −1.24345.E−04 | 3.06414.E−04 |

According to the fourth embodiment of the present invention, the refractive power P1 of the first lens L1 satisfies P1=−0.151e−7, the refractive power P2 of the second lens L2 satisfies P2=0.472, the refractive power P4 of the fourth lens L4 satisfies P4=0.053, the refractive power P5 of the fifth lens L5 satisfies P5=0.909, and the refractive power P6 of the sixth lens L6 satisfies P6=−1.197.

In addition, according to the fourth embodiment of the present invention, the total optical path length (TOPL) of the lens system, which is the sum of values obtained by multiplying the distance from the object-side surface of the first lens L1 to the image sensor by the refractive powers of the respective lenses, satisfies $$TOPL = \sum_{n=1}^{16}(CTn \times Ndn) = 3.937.$$

In addition, the total optical path length (TOPL) and the image height (Himg) satisfy TOPL/Himg=1.562.

In addition, according to the fourth embodiment of the present invention, the value of Sag SAG42 of the outermost side of the effective diameter of the image-side surface of the fourth lens L4 and the value of Sag SAG51 of the outermost side of the effective diameter of the object-side surface of the fifth lens L5 satisfy |SAG42|+|SAG51|=0.392, and the curvature C6 of the image-side surface of the third lens L3 satisfies C6=0.1e−17.

In addition, according to the fourth embodiment of the present invention, the lens thickness et1 at the height of the effective diameter of the image-side surface of the first lens L1 and the central thickness ct1 of the first lens L1 satisfy |et1−ct1|=0.008, the lens thickness et4 at the height of the effective diameter of the image-side surface of the fourth lens L4 and the central thickness ct4 of the fourth lens L4 satisfy |et4−ct4|=0.017, and the lens thickness et5 at the height of the effective diameter of the image-side surface of the fifth lens L5 and the central thickness ct5 of the fifth lens L5 satisfy |et5−ct5|=0.145.

FIG. 10 is a view showing aberration according to a fourth embodiment of the present invention.

First data of FIG. 10 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fourth embodiment of the present invention is 0.025 mm (focus) or less, which is determined to be good.

Second data of FIG. 10 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fourth embodiment of the present invention is 0.025 mm (focus) or less, which is determined to be good.

Third data of FIG. 10 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 11 is a view showing a fifth embodiment of the small lens system with alleviated sensitivity according to the present invention.

As shown, a first lens L1, a second lens L2, a third lens L3, a fourth lens L4, a fifth lens L5, and a sixth lens L6 are sequentially arranged from an object on the optical axis. A stop is located between the first lens L1 and the second lens L2.

Table 9 below shows numerical data of the lenses constituting the optical system according to the fifth embodiment of the present invention.

TABLE 9

|  | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 0.7338 |
| 2 | Qcon Asphere | 2.5665 | 0.1000 | 535000.5600 | 0.7100 |
| Stop | Qcon Asphere | 2.5316 | 0.1402 | | 0.6917 |
| 4 | Qcon Asphere | 1.5034 | 0.4054 | 544100.5600 | 0.7064 |
| 5 | Qcon Asphere | −3.8070 | 0.0500 | | 0.6907 |
| 6 | Qcon Asphere | −2.7664 | 0.1000 | 634000.2390 | 0.6540 |
| 7 | Qcon Asphere | Infinity | 0.3706 | | 0.6945 |
| 8 | Qcon Asphere | 1.9422 | 0.1432 | 670000.1940 | 0.8168 |
| 9 | Qcon Asphere | 1.8553 | 0.3812 | | 0.9004 |
| 10 | Qcon Asphere | −35.6526 | 0.5854 | 544100.5600 | 0.9700 |
| 11 | Qcon Asphere | −0.5939 | 0.1304 | | 1.2062 |
| 12 | Qcon Asphere | −2.0563 | 0.1550 | 535000.5600 | 1.6124 |
| 13 | Qcon Asphere | 0.6705 | 0.2086 | | 2.0730 |
| 14 | Sphere | Infinity | 0.1100 | BK7_SCHOTT | 2.2452 |
| 15 | Sphere | Infinity | 0.6100 | | 2.2816 |
| Image | Sphere | Infinity | 0.0100 | | 2.5200 |

As shown in FIG. 11, the first lens L1, the second lens L2, the third lens L3, the fourth lens L4, the fifth lens L5, and the sixth lens L6 are sequentially arranged from the object, and the Qcon polynomial of each lens based on Qcon asphere thereof is represented by Mathematical Expression 1 above.

Qcon. coefficients are obtained from Mathematical Expression 1 above as shown in Table 10 below.

TABLE 10

| Surface | 2 | Stop | 4 | 5 | 6 | 7 |
|---|---|---|---|---|---|---|
| Y Radius | 2.56650.E+00 | 2.53157.E+00 | 1.50343.E+00 | −3.80696.E+00 | −2.76644.8+00 | 1.00000.E+03 |
| Normalization Radius | 7.30000.E−01 | 7.38989.E−01 | 7.97574.E−01 | 7.50000.E−01 | 7.30000.E−01 | 8.33748.E−01 |
| K | −2.37779.E+01 | 1.04358.E+01 | 2.26568.E+00 | 3.93100.E+00 | 0.00000.E+00 | −7.16111.E+01 |
| 4th Qcon Coefficient | −5.86410.E−02 | −1.41920.E−01 | −1.10205.E−01 | −6.64293.E−02 | −1.33968.E−02 | −4.57007.E−03 |
| 6th Qcon Coefficient | 6.49956.E−03 | 4.49876.E−03 | −8.60403.E−03 | 6.56438.E−03 | −5.57399.E−04 | −1.43926.E−02 |
| 8th Qcon Coefficient | −2.25191.E−04 | −5.43242.E−03 | −1.92665.E−03 | 1.85458.E−03 | −3.95848.E−05 | 1.78779.E−03 |
| 10th Qcon Coefficient | −2.28233.E−04 | −1.84453.E−03 | 9.72392.E−04 | 1.22654.E−03 | −5.93191.E−04 | 1.71928.E−03 |
| 12th Qcon Coefficient | −4.43910.E−05 | −7.79747.E−04 | 4.38860.E−04 | 7.69523.E−04 | −6.17865.E−04 | 2.34620.E−04 |
| 14th Qcon Coefficient | −2.53898.E−05 | −3.01949.E−04 | 6.08166.E−05 | 6.19732.E−04 | −2.70936.E−04 | −8.17030.E−04 |
| 16th Qcon Coefficient | −2.62750.E−05 | −1.08136.E−04 | −2.50872.E−05 | 4.53532.E−04 | −2.57103.E−04 | −1.34881.E−03 |
| 18th Qcon Coefficient | −1.42030.E−05 | −3.10891.E−05 | −1.59548.E−05 | 3.48044.E−04 | −1.54472.E−04 | −9.62491.E−04 |
| 20th Qcon Coefficient | −3.39146.E−06 | −2.98454.E−06 | −1.47601.E−06 | 2.62272.E−04 | −9.10031.E−05 | −4.37762.E−04 |
| 22th Qcon Coefficient | — | — | — | 1.75640.E−04 | −4.11271.E−05 | −5.19885.E−05 |
| 24th Qcon Coefficient | — | — | — | 1.04776.E−04 | −2.10959.E−05 | 8.95024.E−05 |
| 26th Qcon Coefficient | — | — | — | 6.21666.E−05 | 2.91776.E−08 | 7.97042.E−05 |
| 28th Qcon Coefficient | — | — | — | 2.96862.E−05 | 6.24390.E−06 | 2.59259.E−05 |
| 30th Qcon Coefficient | — | — | — | 8.46607.E−06 | 4.43905.E−06 | 2.25568.E−06 |

| Surface | 8 | 9 | 10 | 11 | 12 | 13 |
|---|---|---|---|---|---|---|
| Y Radius | 1.94219.E+00 | 1.85533.E+00 | −3.56528.E+01 | −5.93942.E−01 | −2.05633.E+00 | 6.70538.E−01 |
| Normalization Radius | 8.06072.E−01 | 1.03743.E+00 | 1.16732.E+00 | 1.41667.E+00 | 1.70028.E−00 | 2.10194.E+00 |
| K | −5.89305.E+01 | 0.00000.E+00 | −8.58271.E+01 | −5.88401.E+00 | −9.42220.E+01 | −4.50852.E+00 |
| 4th Qcon Coefficient | −5.27073.E−02 | −3.27924.E−01 | −5.91336.E−01 | −4.96675.E−01 | −6.17632.E−01 | −1.53474.E+00 |
| 6th Qcon Coefficient | −1.45725.E−02 | 6.48724.E−02 | −1.06900.E−01 | 7.54605.E−02 | 2.33476.E−01 | 2.63605.E−01 |
| 8th Qcon Coefficient | 2.60277.E−03 | 1.11891.E−02 | 1.54030.E−02 | 6.81671.E−02 | −7.99361.E−02 | −6.77921.E−02 |
| 10th Qcon Coefficient | −1.26662.E−03 | 1.68465.E−03 | 1.20446.E−02 | 4.83195.E−02 | −6.93027.E−03 | 8.73865.E−02 |
| 12th Qcon Coefficient | −1.22208.E−06 | 4.32001.E−04 | 5.03337.E−03 | 1.83575.E−02 | 7.38851.E−03 | 3.54359.E−02 |
| 14th Qcon Coefficient | −3.34624.E−04 | 4.05681.E−03 | 1.48765.E−02 | −1.01187.E−02 | −7.86101.E−03 | 5.50242.E−02 |
| 16th Qcon Coefficient | −3.79696.E−05 | 3.43855.E−03 | 1.03200.E−02 | −2.09240.E−02 | −7.03423.E−03 | 2.23610.E−02 |
| 18th Qcon Coefficient | −5.11682.E−05 | 2.53617.E−08 | −5.38945.E−03 | −1.64999.E−02 | −8.00018.E−03 | 9.72034.E−03 |
| 20th Qcon Coefficient | −6.72900.E−06 | 1.96341.E−03 | −1.79516.E−02 | 2.50748.E−03 | −3.43171.E−03 | −6.97351.E−03 |
| 22th Qcon Coefficient | −5.36903.E−06 | 1.79504.E−08 | −1.67127.E−02 | 1.53515.E−02 | −3.23388.E−08 | −9.54205.E−08 |
| 24th Qcon Coefficient | −4.20343.E−06 | 1.34916.E−03 | −9.23539.E−03 | 1.41096.E−02 | −4.31819.E−04 | −8.82919.E−03 |
| 26th Qcon Coefficient | 9.79347.E−07 | 7.88490.E−04 | −3.08156.E−02 | 7.43850.E−03 | −6.79788.E−04 | −4.51597.E−03 |

TABLE 10-continued

| 28th Qcon Coefficient | -2.67725.E-06 | 3.08982.E-04 | -5.10937.E-04 | 2.40481.E-03 | -4.36081.E-04 | -1.79561.E-03 |
| 30th Qcon Coefficient | 1.49342.E-06 | 7.60412.E-05 | 1.08446.E-05 | 4.94331.E-04 | -5.53495.E-04 | -3.24067.E-04 |

According to the fifth embodiment of the present invention, the refractive power P1 of the first lens L1 satisfies P1=0.737e−10, the refractive power P2 of the second lens L2 satisfies P2=0.493, the refractive power P4 of the fourth lens L4 satisfies P4=−0.005, the refractive power P5 of the fifth lens L5 satisfies P5=0.909, and the refractive power P6 of the sixth lens L6 satisfies P6=−1.083.

In addition, according to the fifth embodiment of the present invention, the total optical path length (TOPL) of the lens system, which is the sum of values obtained by multiplying the distance from the object-side surface of the first lens L1 to the image sensor by the refractive powers of the respective lenses, satisfies $$TOPL = \sum_{n=1}^{16}(CTn \times Ndn) = 4.335.$$

In addition, the total optical path length (TOPL) and the image height (Himg) satisfy TOPL/Himg=1.720.

In addition, according to the fifth embodiment of the present invention, the value of Sag SAG42 of the outermost side of the effective diameter of the image-side surface of the fourth lens L4 and the value of Sag SAG51 of the outermost side of the effective diameter of the object-side surface of the fifth lens L5 satisfy |SAG42|+|SAG51|=0.332, and the curvature C6 of the image-side surface of the third lens L3 satisfies C6=0.1e−17.

In addition, according to the fifth embodiment of the present invention, the lens thickness et1 at the height of the effective diameter of the image-side surface of the first lens L1 and the central thickness ct1 of the first lens L1 satisfy |et1−ct1|=0.006, the lens thickness et4 at the height of the effective diameter of the image-side surface of the fourth lens L4 and the central thickness ct4 of the fourth lens L4 satisfy |et4−ct4|=0.0197, and the lens thickness et5 at the height of the effective diameter of the image-side surface of the fifth lens L5 and the central thickness ct5 of the fifth lens L5 satisfy |et5−ct5|=0.424.

FIG. 12 is a view showing aberration according to a fifth embodiment of the present invention.

First data of FIG. 12 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fifth embodiment of the present invention is 0.025 mm (focus) or less, which is determined to be good.

Second data of FIG. 12 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fifth embodiment of the present invention is 0.025 mm (focus) or less, which is determined to be good.

Third data of FIG. 12 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention relates to a high-resolution small lens system including a first lens, a second lens, a third lens, a fourth lens, a fifth lens, and a sixth lens sequentially arranged from an object along an optical axis, wherein sensitivity of the small lens system is alleviated while the small lens system is small and lightweight by appropriately designing the refractive power, shape, etc. of each lens.

In particular, the refractive power of each lens is set such that the first lens has a very low refractive power and the second lens has a high positive refractive power while having opposite convex surfaces, whereby sensitivity of the lens system to tolerance is alleviated.

In addition, the fifth lens has a high positive refractive power, and the sixth lens has a high negative refractive power, whereby the length of the lenses is reduced, and the total optical path length (TOPL) of the lens system and an image height (Himg) satisfy TOPL/Himg <1.8, whereby TTL of the lens system is reduced, and therefore a small-thickness, high-performance lens system is provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system comprising a first lens, a second lens, a third lens, a fourth lens, a fifth lens, and a sixth lens sequentially arranged from an object, wherein
the first lens has a refractive power (P1) satisfying −0.01 mm$^{-1}$<P1<0.01 mm$^{-1}$,
the second lens has a convex object-side surface and a convex image-side surface, the second lens having a refractive power (P2) satisfying 0.4 mm$^{-1}$<P2,
the third lens has a negative refractive power, the third lens having a curvature (C6) of an image-side surface satisfying −0.01 mm$^{-1}$<C6<0.01 mm$^{-1}$,
the fourth lens has a refractive power (P4) satisfying −0.1 mm$^{-1}$<P4<0.1 mm$^{-1}$,
the fifth lens has a refractive power (P5) satisfying 0.7 mm$^{-1}$<P5,
the sixth lens has a refractive power (P6) satisfying P6<−0.7 mm$^{-1}$, and
a total optical path length (TOPL) of the lens system, which is a sum $$\left(TOPL = \sum_{n=1}^{16}(CTn \times Ndn)\right)$$

of values obtained by multiplying a distance from an object-side surface of the first lens to an image sensor by the refractive powers of the respective lenses, and an image height (Himg) satisfy TOPL/Himg <1.8.

2. The small lens system according to claim 1, wherein a value of Sag (SAG42) of an outermost side of an effective diameter of an image-side surface of the fourth lens and a value of Sag (SAG51) of an outermost side of an effective diameter of an object-side surface of the fifth lens satisfy 0.1 mm<|SAG42|+|SAG51|<0.5 mm.

3. The small lens system according to claim 1, wherein a lens thickness (et1) at a height of an effective diameter of an image-side surface of the first lens and a central thickness (ct1) of the first lens satisfy |et1−ct1|<0.07 mm.

4. The small lens system according to claim 1, wherein a lens thickness (et4) at a height of an effective diameter of an image-side surface of the fourth lens and a central thickness (ct4) of the fourth lens satisfy |et4−ct4|<0.05 mm.

5. The small lens system according to claim 1, wherein a lens thickness (et5) at a height of an effective diameter of an image-side surface of the fifth lens and a central thickness (ct5) of the fifth lens satisfy |et5−ct5|>0.14 mm.

6. The small lens system according to claim 1, wherein
all surfaces of the first lens to the sixth lens are formed as aspherical surfaces, and each of the lenses is made of plastic.

7. The small lens system according to claim 1, wherein an Abbe number (V1) of the first lens, an Abbe number (V2) of the second lens, an Abbe number (V3) of the third lens, an Abbe number (V4) of the fourth lens, an Abbe number (V5) of the fifth lens, and an Abbe number (V6) of the sixth lens respectively satisfy 50<V1<60, 50<V2<60, 15<V3<30, 15<V4<30, 50<V5<60, and 50<V6<60.

* * * * *